United States Patent [19]

Sandaiji et al.

[11] Patent Number: 4,982,065
[45] Date of Patent: Jan. 1, 1991

[54] METHOD OF PRODUCING A CORE FOR MAGNETIC HEAD

[75] Inventors: Hideto Sandaiji, Kasugai; Fuminori Takeya, Nagoya, both of Japan

[73] Assignee: NGK Insulators, Ltd., Japan

[21] Appl. No.: 399,958

[22] Filed: Aug. 29, 1989

[30] Foreign Application Priority Data

Jul. 3, 1989 [JP] Japan .................................. 1-52946

[51] Int. Cl.$^5$ ............................................. B23K 26/00
[52] U.S. Cl. ............................... 219/121.69; 156/643; 156/654; 219/121.68
[58] Field of Search ....................... 219/121.68, 121.69; 156/643, 654, 656

[56] References Cited

U.S. PATENT DOCUMENTS

| 4,379,022 | 4/1983 | Melchery et al. | 219/121.68 X |
| 4,439,294 | 3/1984 | Bril et al. | 156/643 X |
| 4,751,779 | 6/1988 | Nagatomo et al. | 156/646 X |

FOREIGN PATENT DOCUMENTS

| 51-29118 | 3/1976 | Japan . |
| 55-117726 | 9/1980 | Japan . |
| 57-212617 | 12/1982 | Japan . |
| 60-60995 | 4/1985 | Japan . |
| 61-260408 | 11/1986 | Japan . |
| 62-27394 | 2/1987 | Japan . |
| 62-83483 | 4/1987 | Japan . |

OTHER PUBLICATIONS

Material Research Society, Pittsburgh, 1989, "Laser Induced Chemical Etching of Composite Structure of Ferrite and Sendext".
Precision Machine Soc., 1985, Autumn Sym. Scientific Lecture Articles, pp. 443-446.
Nikkei Mechanical, 1986, 5.5, (pp. 50-52).
Appl. Phys. A 47, 319-325, (1988), "Wet-Chemical Etching of Mn—Zn Ferrite by Focused Ar$^+$-Laser Irradiation in H$_3$PO$_4$".
Appl. Phys. Lett., vol. 43, No. 2, Jul. 15, 1983, pp. 146-148, "Laser-Controlled Chemical Etching of Aluminum".
Precision Machine Soc., 1985, Spring Sym., Scientific Lecture Articles, (Presentn. No. 404).
Engineering Materials, 33, No. 14, pp. 57-52.

Primary Examiner—C. L. Albritton
Attorney, Agent, or Firm—Parkhurst, Wendel & Rossi

[57] ABSTRACT

A core for magnetic head, which has a groove depth of at least 10 $\mu$m with a dimensional accuracy not lower than ±2 $\mu$m in the groove for defining the track of the core, can be obtained by subjecting a gapped bar made of ferrite and/or Sendust to a laser-induced etching wherein a laser beam having a focused beam diameter of not larger than 50 $\mu$m, preferably not larger than 20 $\mu$m, and a laser power P in a specified range is irradiated at a scanning speed V that is within a range between 2 $\mu$m/sec and 200 $\mu$m/sec and delimited by the laser power P, in a phosphoric acid or alkali metal hydroxide aqueous solution.

4 Claims, 18 Drawing Sheets

FIG_3

FIG_6

FIG_9
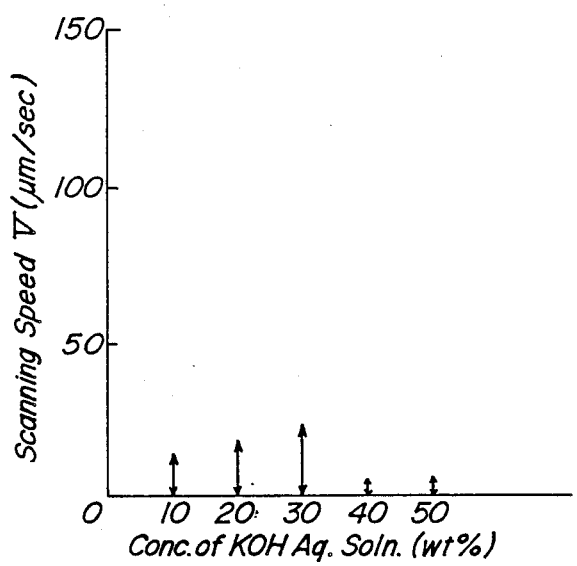
FIG_10
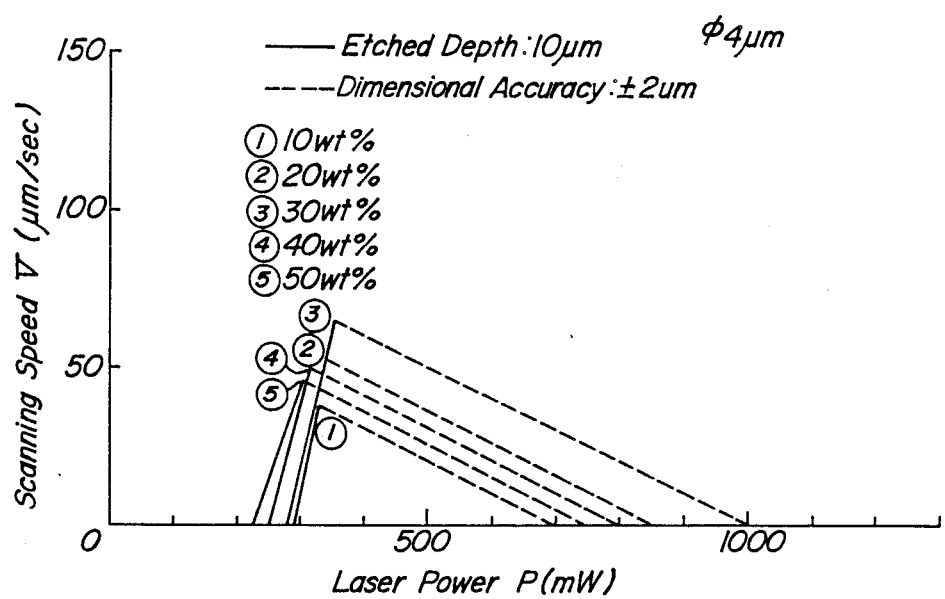

FIG._13
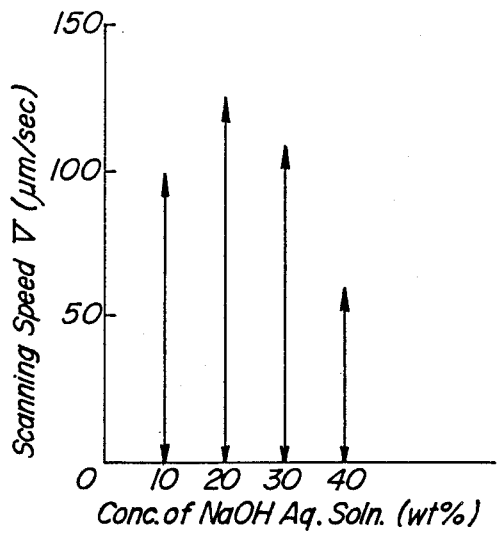
FIG._14
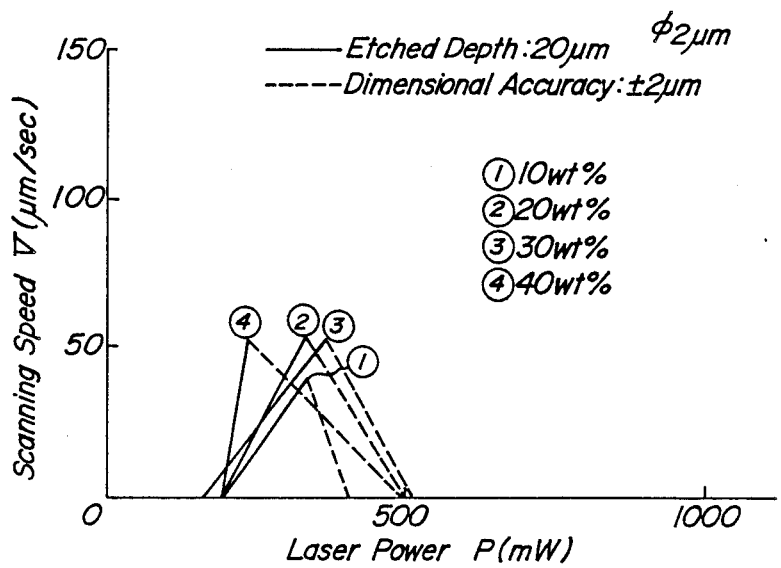

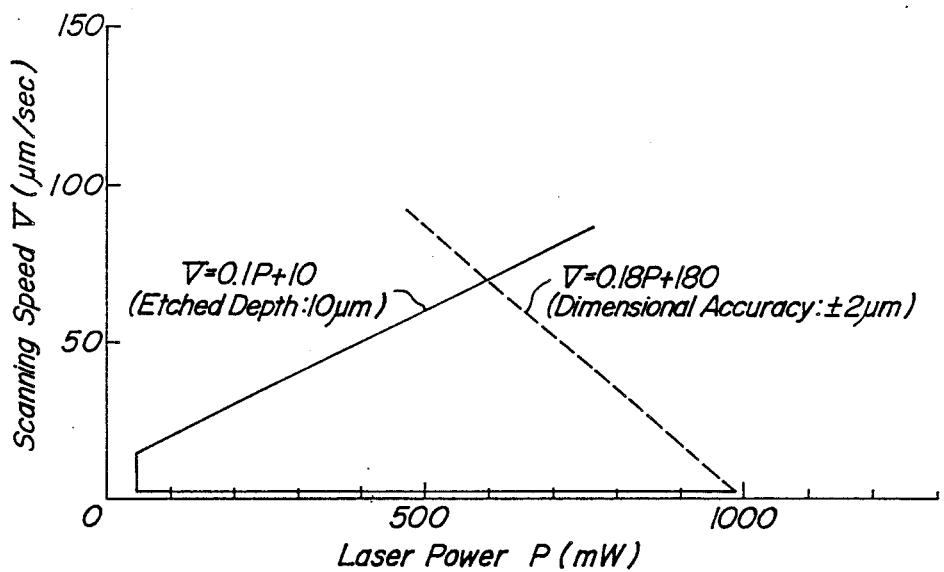
FIG._15
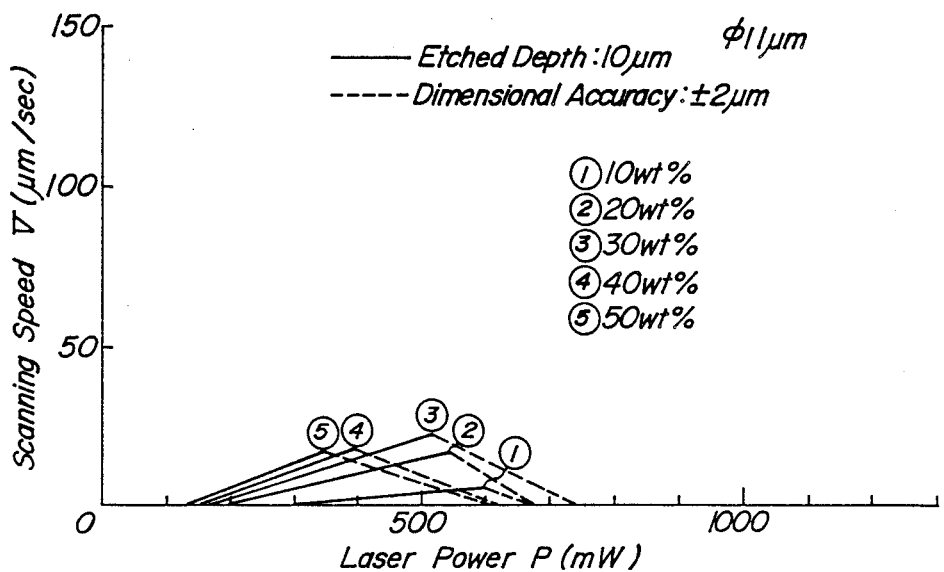
FIG._16

FIG_17
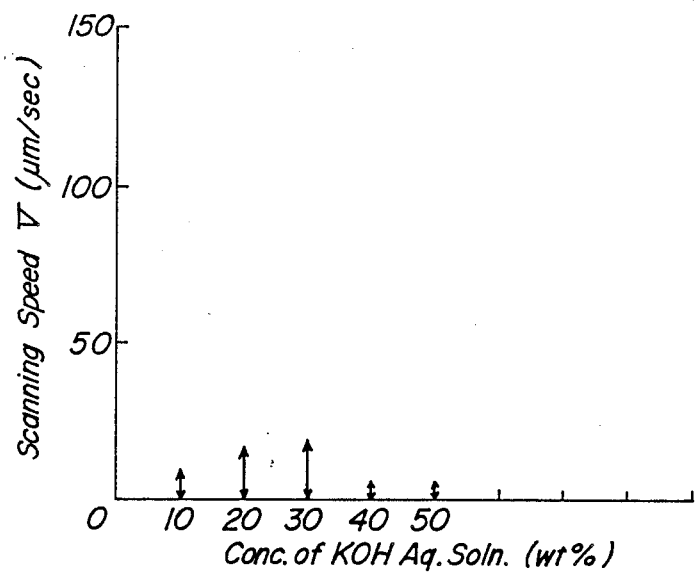
FIG_18
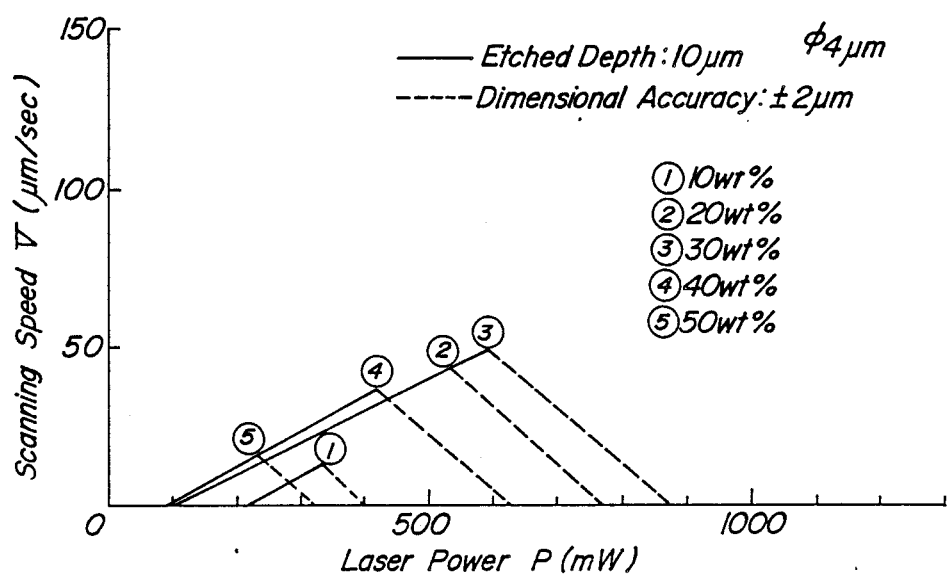

FIG._21
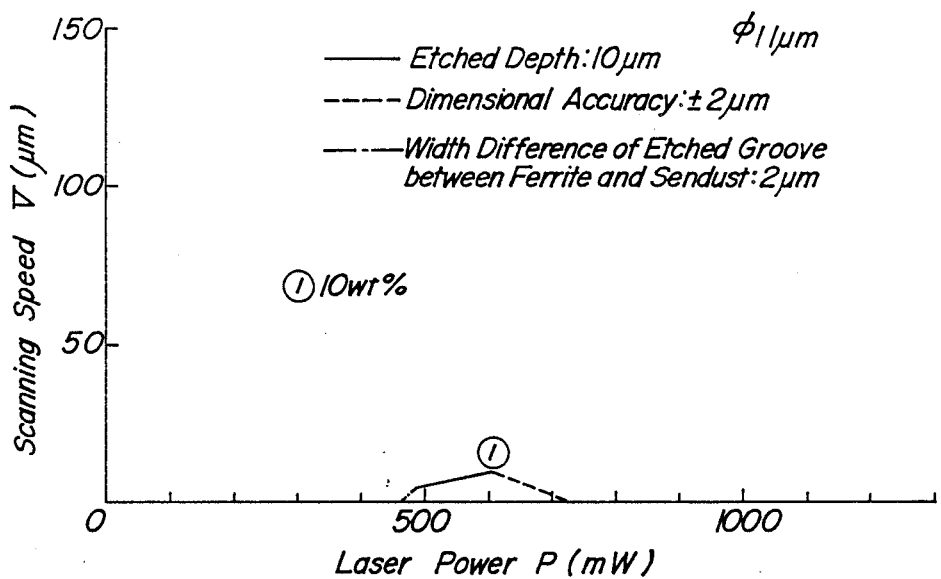
FIG._22
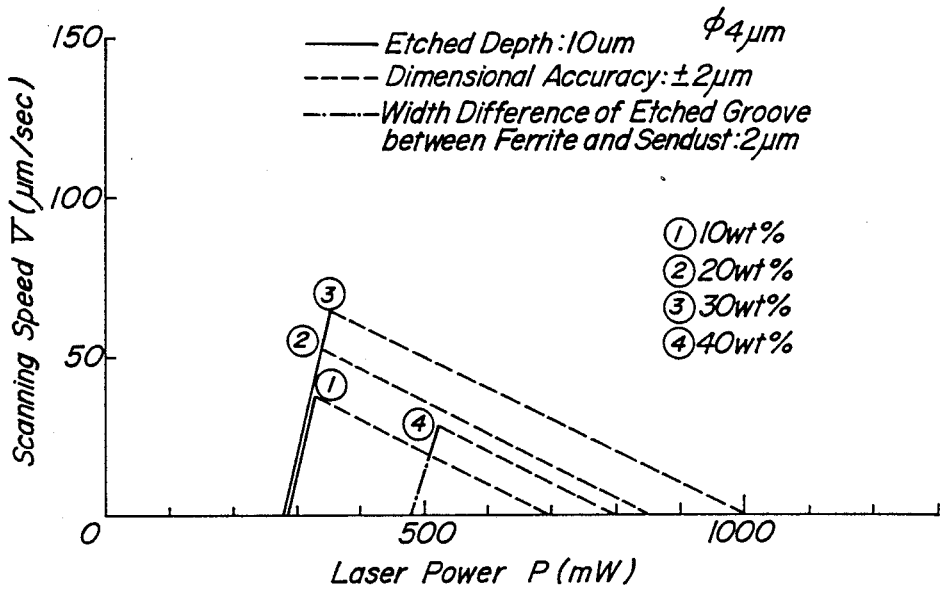

FIG_25
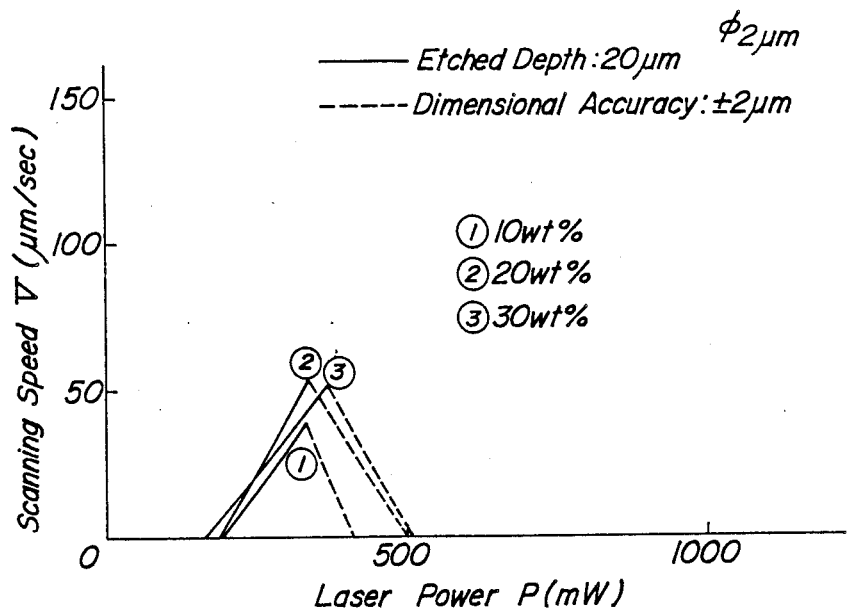

FIG_27a 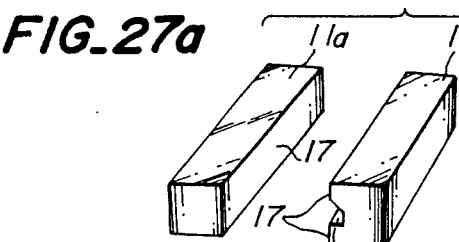
FIG_27e 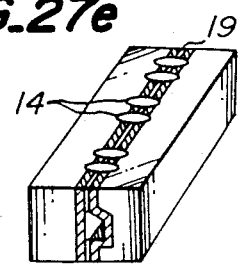
FIG_27b 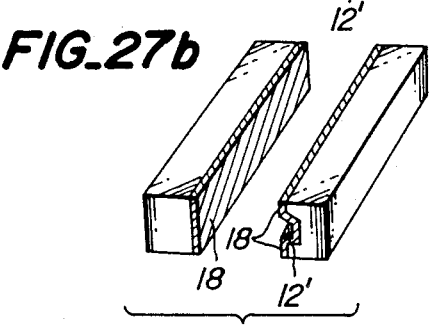
FIG_27f 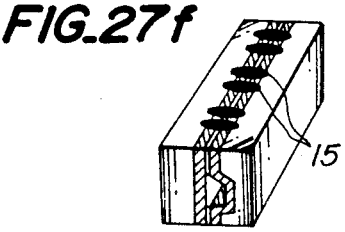
FIG_27c 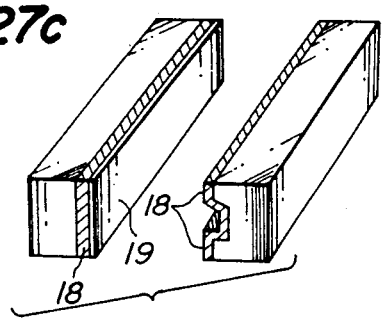
FIG_27g 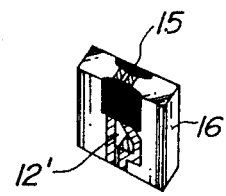
FIG_27d 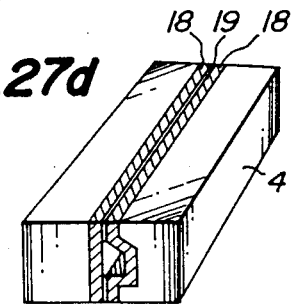

METHOD OF PRODUCING A CORE FOR MAGNETIC HEAD

BACKGROUND OF THE INVENTION

1. Field of the Invention

The present invention relates to a method of producing a core for magnetic head, and more particularly relates to a method of producing a core for magnetic head having a track formed by a laser-induced etching wherein a thermochemical reaction is induced by a laser beam.

2. Description of the Related Art

Recently, magnetic recorders, such as floppy disc drive (FDD), rigid magnetic disc drive (RDD), VTR or the like, have been steadily high-densified and, accordingly, the track width of the magnetic head tends to become narrower with a higher accuracy. Nowadays, the track width requires a dimensional accuracy not lower than $\pm 2$ $\mu$m for VTR and FDD, or not lower than $\pm 1$ $\mu$m for RDD.

In forming such cores for magnetic head, there have heretofore been known a laser machining in air of a track portion, which is disclosed in Japanese Patent Application Laid-open Nos. 29,118/76, 212,617/82, etc. Further, Japanese Patent Application Nos. 117,726/80, 260,408/86, etc. disclose the formation of the track, by laser machining in air, of a core for magnetic head that is made of a high magnetic permeable alloy, such as Sendust or the like, or of a composite core for magnetic head that is composed of ferrite and a high magnetic permeable alloy.

However, according to these methods, since the temperature of the material to be machined reaches above the melting point temperature of the material, a processing strain due to heat is formed on the machined surface, accompanied with the formation of cracks on the surface, and properties of the resulting magnetic head are deteriorated. Further, these methods have presented problems such that melted and solidified substances or melted and scattered substances adhere to the machined surface and the vicinity thereof, as well as problems, such as a thermal strain, cracks or the like, to deteriorate the surface roughness or dimensional accuracy, which do not allow a track processing of high accuracy to be conducted with a dimensional accuracy not lower than $\pm 2$ $\mu$m, which has recently been strongly required.

Meanwhile, Japanese Patent Application Laid-open No. 60,995/85, the Precision Machine Society, 1985, Spring Symposium, Scientific Lecture Articles (Presentation No. 404) and Industrial Materials, 33, No. 14 (P.57~p.62) disclose, in a field other than the magnetic head processing, three methods of machining ceramics, such as ferrite, $Si_3N_4$, SiC or the like, by a laser-induced etching wherein a laser beam is irradiated in a potassium hydroxide aqueous solution. However, any of these methods disclosed in the above references lack requirements for obtaining a high accuracy which is necessary for the magnetic head processing, so that the machining with such an accuracy as required in the magnetic head processing has not been performable.

SUMMARY OF THE INVENTION

The object of the present invention is to obviate the drawbacks of the above described conventional methods and to provide a method wherein a track with a high accuracy is machined by a laser-induced etching method to produce cores for magnetic head with a high reliability.

The first embodiment of the present invention is, in a method of producing a core for magnetic head, wherein a track width of the core for magnetic head is defined by a laser machining, the improvement comprising machining by a laser-induced etching wherein a laser beam having a focused beam diameter of not larger than 50 $\mu$m and a power P of 50~1,900 mW is irradiated, in a 10~90 weight % phosphoric acid aqueous solution, at a scanning speed V in the range of 2~200 $\mu$m/sec which scanning speed satisfies simultaneously both the following conditions:

$$V \leq 0.31P + 34 \text{ and}$$

$$V \leq -0.14P + 271.$$

The second embodiment of the present invention is, in a method of producing a core for magnetic head composed of ferrite, wherein a track width of the core for magnetic head is defined by a laser machining, the improvement comprising machining by a laser-induced etching wherein a laser beam having a focused beam diameter of not larger than 20 $\mu$m and a power P of 50~1,300 mW is irradiated, in a 5~55 weight % alkali metal hydroxide aqueous solution, at a scanning speed V in the range of 2~150 $\mu$m/sec which scanning speed satisfies simultaneously both the following conditions:

$$V \leq 0.34P + 13 \text{ and}$$

$$V \leq -0.17P + 217.$$

The third embodiment of the present invention is, in a method of producing a core for magnetic head composed of Sendust, wherein a track width of the core for magnetic head is defined by a laser machining, the improvement comprising machining by a laser-induced etching wherein a laser beam having a focused beam diameter of not larger than 20 $\mu$m and a power P of 50~1,000 mW is irradiated, in a 5~55 weight % alkali metal hydroxide aqueous solution, at a scanning speed V in the range of 2~70 $\mu$m/sec which scanning speed satisfies simultaneously both the following conditions:

$$V \leq 0.1P + 10 \text{ and}$$

$$V \leq -0.18P + 180.$$

The fourth embodiment of the present invention is, in a method of producing a composite core for magnetic head composed of ferrite and Sendust, wherein a track width of the core for magnetic head is defined by a laser machining, the improvement comprising machining by a laser-induced etching wherein a laser beam having a focused beam diameter of not larger than 20 $\mu$m and a power P of 50~1,000 mW is irradiated, in a 5~55 weight % alkali metal hydroxide aqueous solution, at a scanning speed V in the range of 2~130 $\mu$m/sec which scanning speed satisfies simultaneously both the following conditions:

$$V \leq 0.34P + 13 \text{ and}$$

$$V \leq -0.19P + 190.$$

Throughout this specification, the expression, "a dimensional accuracy not lower than $\pm x$", is to be understood to mean "a dimensional accuracy that is not lower than the dimensional accuracy of ±x", or "the absolute numerical value of the dimensional accuracy is not larger than |x|".

BRIEF DESCRIPTION OF THE DRAWINGS

FIG. 9 is a graph illustrating the range of the scanning speed wherein a track of a ferrite core for magnetic head can be machined with a dimensional accuracy not lower than ±2 $\mu$m, when the focused laser beam diameter is 11 $\mu$m, the laser power is kept constant at 550 mW and the concentration of the potassium hydroxide aqueous solution is varied, in the second embodiment of the invention;

FIG. 10 is a graph illustrating the result of an experiment of machining a track of a ferrite core for magnetic head, conducted with a laser beam having a focused beam diameter of 4 $\mu$m and various concentrations of the potassium hydroxide aqueous solution, in the second embodiment of the invention;

FIG. 13 is a graph illustrating the range of the scanning speed wherein a track of a ferrite core for magnetic head can be machined with a dimensional accuracy not lower than ±2 $\mu$m, when the focused laser beam diameter is 4 $\mu$m, the laser power is kept constant at 550 mW and the concentration of the sodium hydroxide aqueous solution is varied, in the second embodiment of the invention;

FIG 14 is a graph illustrating the result of an experiment of machining a track of a ferrite core for magnetic head, conducted with a laser beam having a focused beam diameter of 2 $\mu$m and various concentrations of the sodium hydroxide aqueous solution, in the second embodiment of the invention;

FIG. 15 is a graph illustrating the range of a condition wherein a track of a Sendust core for magnetic head is machined to an etched depth of at least 10 $\mu$m with a dimensional accuracy not lower than ±2 $\mu$m, in an alkali metal hydroxide aqueous solution, in the third embodiment of the invention;

FIG. 16 is a graph illustrating the result of an experiment of machining a track of a Sendust core for magnetic head, conducted with a focused laser beam diameter of 11 $\mu$m and various concentrations of the potassium hydroxide aqueous solution, in the third embodiment of the invention;

FIG. 17 is a graph illustrating the range of the scanning speed wherein a track of a Sendust core for magnetic head can be machined with a dimensional accuracy not lower than ±2 $\mu$m, when the focused laser beam diameter is 11 $\mu$m, the laser power is kept constant at 550 mW and the concentration of the potassium hydroxide aqueous solution is varied, in the third embodiment of the invention;

FIG. 18 is a graph illustrating the result of an experiment of machining a track of a Sendust core for magnetic head, conducted with a laser beam having a focused beam diameter of 4 $\mu$m and various concentrations of the potassium hydroxide aqueous solution, in the third embodiment of the invention;

FIG. 21 is a graph illustrating the result of an experiment of machining a track of a ferrite/Sendust composite core for magnetic head, conducted with a laser beam having a focused beam diameter of 11 $\mu$m and various concentrations of the potassium hydroxide aqueous solution, in the fourth embodiment of the invention;

FIG. 22 is a graph illustrating the result of an experiment of machining a track of a ferrite/Sendust composite core for magnetic head, conducted with a laser beam having a focused beam diameter of 4 μm and various concentrations of the potassium hydroxide aqueous solution, in the fourth embodiment of the invention;

FIG. 25 is a graph illustrating the result of an experiment of machining a track of a ferrite/Sendust composite core for magnetic head, conducted with a laser beam having a focused beam diameter of 2 μm and various concentrations of the sodium hydroxide aqueous solution, in the fourth embodiment of the invention;

FIGS. 27a-27g show a flow diagram illustrating the procedure in the case where the fourth embodiment of the present invention is applied to the production of a ferrite/Sendust composite core for VTR magnetic head.

DESCRIPTION OF THE PREFERRED EMBODIMENT

Figure 1:
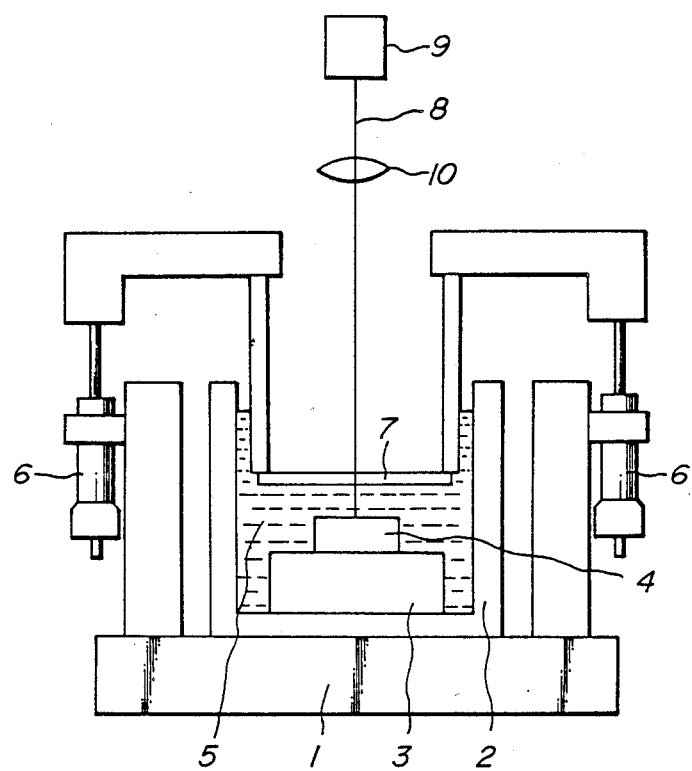
FIG. 1 is a diagrammatic view of one embodiment of apparatuses to be used for carrying out the present invention.

In the above-described embodiments of the present invention the surface of a gapped bar having a coil turn hole and a magnetic gap, which is positioned in a phosphoric acid aqueous solution or an alkali metal hydroxide aqueous solution, such as potassium hydroxide, sodium hydroxide or the like, is irradiated by a laser beam having a predetermined power at a predetermined scanning speed to thereby induce a chemical reaction between the gapped bar and the phosphoric acid or alkali metal hydroxide, while the phosphoric acid aqueous solution or alkali metal hydroxide aqueous solution flows counter to the advancing direction of the etching point. Therefore, a fresh phosphoric acid aqueous solution or alkali metal hydroxide aqueous solution is successively supplied to the etching point and, simultaneously, etched-off wastage is removed rapidly from the etching point, so that a laser-induced etching proceeds efficiently. Consequently, when the groove or hole machining is conducted by the laser-induced etching to form a track according to the present invention, problems entailed in the conventional laser-machining, such as melting and solidification of the etched materials, a processing strain or denaturing due to heat, accompanied with the formation of microcracks on the surface, or the like, can be eliminated.

A core for magnetic head can be obtained through the steps of: subjecting a gapped bar made of ferrite, Sendust or the like to a laser-induced etching to machine grooves or holes defining a track width, to form a track; then filling the grooves or holes with glass, if required, to reinforce the track; grinding a slide surface until a dimension required for the magnetic gap depth, that is, the distance from the slidably contacting surface with a recording medium to the coil turn hole, of the magnetic head, is obtained; and, further, post-processing, such as slicing of the gapped bar into a plurality of cores having a required length.

The gap depth is generally about 30 μm in the magnetic head for VTR and FDD, and about 5 μm in the magnetic head for RDD. Accordingly, in the formation of a track on the gapped bar, the depth of the groove or hole to define the track is required to be at least 10 μm, preferably at least 30 μm, more preferably at least 50 μm, taking the post-processing, such as grinding of the sliding surface, or the like, into consideration. Further, the dimensional accuracy to define the track is required to be not lower than ±2 μm, preferably not lower than ±1 μm.

In the method according to the present invention the etched depth and the dimensional accuracy depend upon the laser power and the scanning speed of the laser beam. According to the experimental data, the higher the laser power or the lower the scanning speed is, the larger will tend to be the etched depth. However, when the laser power is excessively high, the melts due to the heat of the laser beam exceed in amount the reaction products due to chemical reaction with phosphoric acid or an alkali metal hydroxide, and melted and solidified materials adhere to the etched portion, so that microcracks are formed or the dimensional accuracy is lowered. Alternatively, when the scanning speed is excessively high, a satisfactory chemical reaction does not occur and a similar tendency to the above is shown.

Therefore, when the laser power is lower than 50 mW in machining ferrite or Sendust, a satisfactorily effective laser-induced etching to obtain a required etched depth of at least 10 μm cannot be carried out. Moreover, in order to carry out the laser-induced etching in a commercial scale, it is desirable that the etching time per one track is within 30 seconds and the scanning speed is required to be at least 2 μm/sec, to more effectuate the method according to the present invention as compared with the conventional mechanical processing method.

In the present invention the conditions capable of forming a track having an etched depth of at least 10 μm with a dimensional accuracy not lower than ±2 μm, in a commercial scale, are as follows:

In the first embodiment of the invention, a laser beam with a laser power P of 50~1,900 mW is irradiated in a phosphoric acid aqueous solution at a scanning speed V lying in the range of 2~200 μm/sec and in the area delineated by the conditions: $V \leq 0.31P + 34$ and $V \leq -0.14P + 271$ (referring to FIG. 2).

In the core for magnetic head specifically made of ferrite according to the second embodiment of the invention, a laser beam with a laser power P of 50~1,300 mW is irradiated in an alkali metal hydroxide aqueous solution at a scanning speed V lying in the range of 2~150 μm/sec and in the area delineated by the conditions: $V \leq 0.34P + 13$ and $V \leq -0.17P + 217$ (referring to FIG. 7).

In the core for magnetic head specifically made of Sendust according to the third embodiment of the invention, a laser beam with a laser power P of 50~1,000 mW is irradiated in an alkali metal hydroxide aqueous solution at a scanning speed V lying in the range of 2~70 μm/sec and in the area delineated by the conditions: $V \leq 0.1P + 10$ and $V \leq -0.18P + 180$ (referring to FIG. 15).

In the composite core for magnetic head specifically composed of ferrite and Sendust according to the fourth embodiment of the invention, a laser beam with a laser power P of 50~1,000 mW is irradiated in an alkali metal hydroxide aqueous solution at a scanning speed V lying in the range of 2~130 μm/sec and in the area delineated by the conditions: $V \leq 0.34P+13$ and $V \leq -0.19P+190$ (referring to FIG. 20).

In the above laser-induced etching method according to the invention the phosphoric acid aqueous solution or alkali metal hydroxide aqueous solution serves as an etching solution for the gapped bar to be machined.

In the case where the gapped bar is made specifically of ferrite, the phosphoric acid aqueous solution is suitable for chemical etching of ferrite as disclosed in Japanese Patent Application Laid-open No. 83,483/87 field by the assignee of the present patent application. The etched depth depends upon the concentration of the phosphoric acid aqueous solution. The higher the concentration is, the larger will be the etched depth. However, when the concentration is excessively high, the flow rate of the solution will decrease whereby the aqueous solution is excessively heated up to boil and forms bubbles which cause scattering of the laser beam, thereby hampering heating of the predetermined portion on the surface of the material being processed, so that the etched depth decreases or the dimensional accuracy is deteriorated.

Alternatively, the iron that is a main ingredient of ferrite and Sendust is etched well by an alkali metal hydroxide. The etched depth also depends upon the concentration of the alkali metal hydroxide aqueous solution. The higher the concentration is, the larger will become the etched depth. However, when the concentration is too high, the etching proceeds so excessively that the etched surface is roughened and the dimensional accuracy is lowered. Alternatively, when the concentration is too low, the chemical reaction products decrease too much to effect a sufficient laser-induced etching, so that a necessary etched depth cannot be obtained. Therefore, the concentrations of the phosphoric acid aqueous solution and the alkali metal hydroxide aqueous solution are required to be 10~90% and 5~55%, by weight, respectively.

When the focused diameter of the laser beam is, in the case of a phosphoric acid aqueous solution, not larger than 50 μm, or in the case of an alkali metal hydroxide aqueous solution, not larger than 20 μm, aimed etched depth and dimensional accuracy can be obtained. However, the focused laser beam diameter has an influence upon the etched shape, etc. Therefore, an interrelation between the focused laser beam diameter and the above-described concentration of the phosphoric acid aqueous solution or alkali metal hydroxide aqueous solution should be further taken into consideration in the selection of etching conditions.

As a laser source, various lasers can be employed. However, in view of the high absorption in a wavelength of 1 μm or less of ferrite and Sendust, preferably used is a laser source, such as second harmonics of YAG laser or Ar ion laser, or the like, which has an excellent oscillation stability and a small diverging angle of laser light.

The present invention will be explained in more detail by way of example referring to the accompanying drawings.

EXAMPLE (1) Structure of apparatus

FIG. 1 illustrates an embodiment of an apparatus to be used for carrying out the present invention. In this Example, in a container 2 placed on an X-Y stage 1 there are arranged a sample holder 3 and a gapped bar 4 to be processed placed thereon. The container 2 is filled with a phosphoric acid aqueous solution or an alkali metal hydroxide aqueous solution, such as potassium hydroxide, sodium hydroxide or the like, 5. The liquid level above the gapped bar 4 of the phosphoric acid or alkali metal hydroxide aqueous solution is controlled by a quartz window 7 whose level is adjustable by means of a micormeter 6. A too low liquid level decreases the flow rate of the solution whereby the aqueous solution is heated up excessively and bubbles are prone to be formed, so that the etched depth is decreased and the dimensional accuracy is lowered. When the liquid level is as high as 200 μm or more, there may scarcely be such an influence. However, when the liquid level is too high, the loss amount of light increases during the laser beam passes through the aqueous solution, resulting in a decrease of the etched depth, or a convection is formed due to upward and downward flows of the solution, which raises wastage ejected from the etching point or bubbles, to scatter the laser beam, resulting in decreases of the etched depth and dimensional accuracy. Therefore, the liquid level is preferred to be at least 200 μm, more preferably 300~10,000 μm.

Further, the quartz window 7 controls the liquid level and at the same time eliminates the fluctuation of the liquid surface, to improve the dimensional accuracy. A laser beam 8 is emitted from a laser source 9 and irradiated through a lens system 10 and the quartz window 7 onto the gapped bar 4. Then, an etching of a predetermined pattern can be carried out by moving the X-Y stage 1.

(2) Determination of etching condition

The etching condition in the case where the present invention is carried out by means of the above described apparatus will be explained hereinafter.

① The first embodiment of the invention

Figure 2:
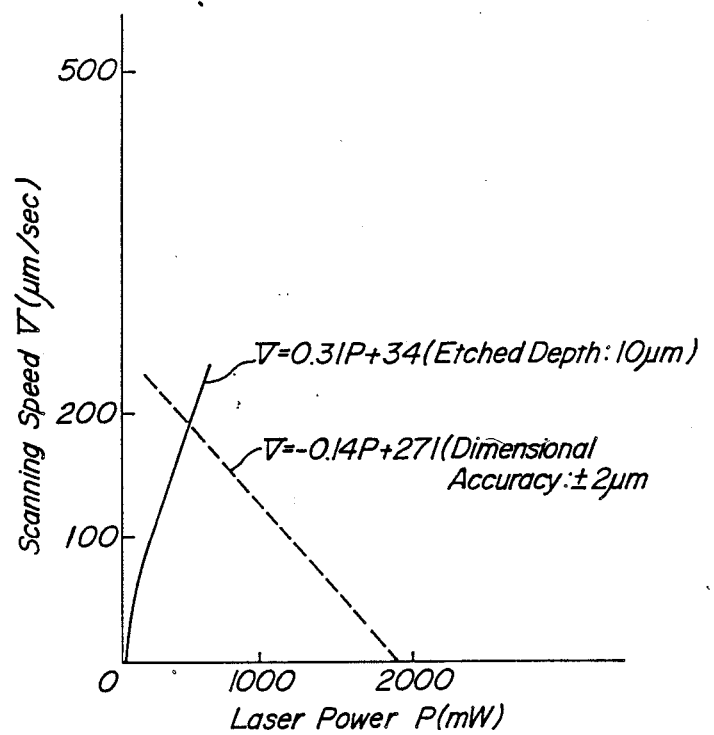
FIG. 2 is a graph illustrating the range of a condition wherein a track of a core for magnetic head is machined to an etched depth of at, least 10 $\mu$m with a dimensional accuracy not lower than ±2 $\mu$m, in a phosphoric acid aqueous solution, in the first embodiment of the present invention.

FIG. 2 is a graph illustrating the range of a condition wherein the machining is carried out in a phosphoric acid aqueous solution to achieve an etched depth of at least 10 μm with a dimensional accuracy not lower than ±2 μm, in the first embodiment of the invention. It can be understood that, when the laser power P is kept constant in the range of 50~1,900 mW and the scanning speed V lies in the range of 2~200 μm/sec, the above range is defined by the condition: $V \leq 0.31P+34$ (solid line) which delineates the upper limit of the scanning speed for obtaining an etched depth of 10 μm and the condition: $V \leq -0.14P+271$ (broken line) which delineates the other upper limit of the scanning speed for obtaining a dimensional accuracy of ±2 μm.

It is understood from FIG. 2 that an etched depth of at least 10 μm with a dimensional accuracy not lower than ±2 μm can be obtained when the scanning speed lies in the range of 2~130 μm/sec and the laser power is, for example, 300 mW, whereas, when the scanning speed lies in the range between more than 130 μm/sec and 230 μm/sec, at the same power, an etched depth of at least 10 μm cannot be obtained, although a dimensional accuracy not lower than ±2 μm can be obtained. Further, it is understood that, when the scanning speed exceeds 230 μm/sec, even a dimensional accuracy not lower than ±2 μm cannot be obtained. Furthermore, it is understood that, when the laser power is 600 mW and the scanning speed lies in the range of 2~185 μm/sec, an etched depth of at least 10 μm with a dimensional accuracy not lower than ±2 μm can be obtained, whereas, when the scanning speed lies in the range between more than 185 μm/sec and 225 μm/sec, at the same power, a dimensional accuracy not lower than ±2 μm cannot be obtained, although an etched depth of at least 10 μm can be obtained. Further, it is understood that, when the scanning speed exceeds 225 μm/sec, even an etched depth of at least 10 μm cannot be obtained.

The condition shown in the above FIG. 2 is based on the result of an experiment under conditions that the concentration of the phosphoric acid aqueous solution is 10~90% by weight and the focused laser beam diameter is not larger than 50 μm. However, even in the case where the laser power and scanning speed are kept constant, the etched depth and dimensional accuracy vary depending upon the concentration and focused laser beam diameter. Accordingly, an adequate condition to achieve an aimed etched depth and dimensional accuracy must be selected in the range shown in the above FIG. 2, taking the concentration and focused laser beam diameter into further consideration. Particularly, when the focused laser beam diameter is reduced, the laser power is preferred to be decreased so that the melts due to the heat of the laser beam may not exceed in amount the reaction products due to chemical reaction with phosphoric acid. Inversely, when the focused laser beam diameter is augmented, the laser power is preferred to be increased so that the laser-induced etching may take place efficiently.

Figure 3:
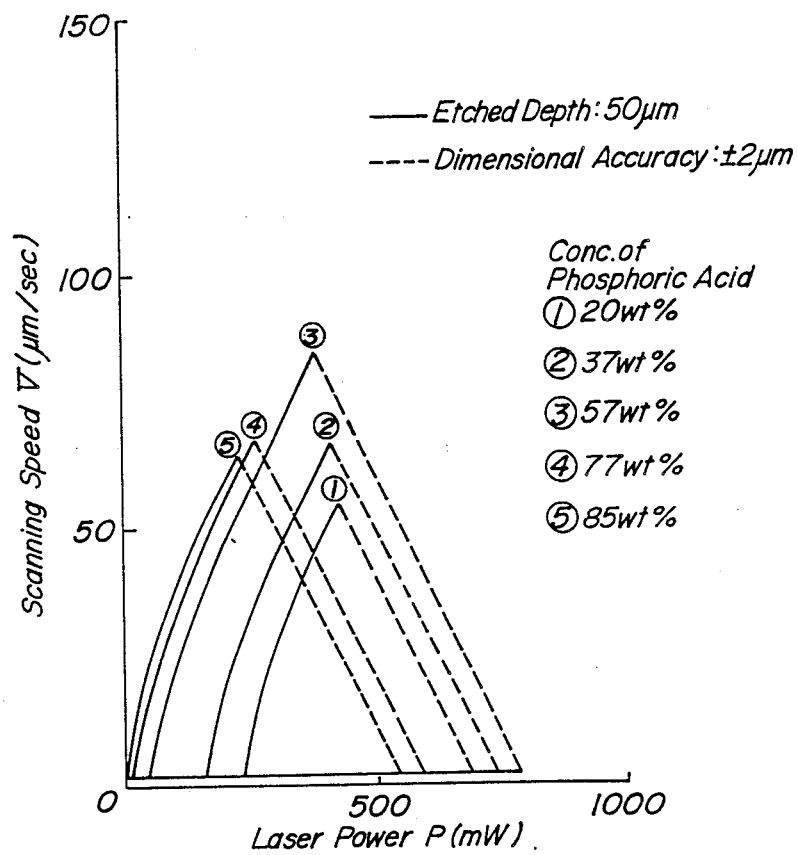
FIG. 3 is a graph illustrating the result of an experiment conducted with a laser beam having a focused beam diameter of 4 $\mu$m and various concentrations of the phosphoric acid aqueous solution, in the first embodiment of the invention.

In FIG. 3 there is shown the result of an experiment conducted using the apparatus shown in FIG. 1 wherein the liquid level is 500 μm, the focused laser beam diameter is 4 μm and the concentration of the phosphoric acid aqueous solution is varied to 20%, 37%, 57%, 77% and 85%, by weight. The solid lines delineate the upper limits of the scanning speed for obtaining an etched depth 50 μm and the broken lines delineate the other upper limits for obtaining the dimensional accuracy of ±2 μm. It is seen that, when the laser power and scanning speed are kept constant, the etched depth increases as the concentration becomes higher, while the dimensional accuracy decreases as the concentration becomes higher or lower than 57% by weight. Since the upper limits of the etched depth and dimensional accuracy depend upon the concentration, it is understood that an adequate range of the machining condition varies.

It is seen that, for example, when the laser power is 450 mW and the scanning speed is 65 μm/sec, an etched depth of at least 50 μm with a dimensional accuracy not lower than ±2 μm can be obtained at a concentration of 57% by weight, whereas a dimensional accuracy not lower than ±2 μm cannot be obtained at a concentration of 37% by weight. Further, it is seen that, even when the concentration is 77% by weight, a dimensional accuracy not lower than ±2 μm cannot be obtained.

Figure 4:
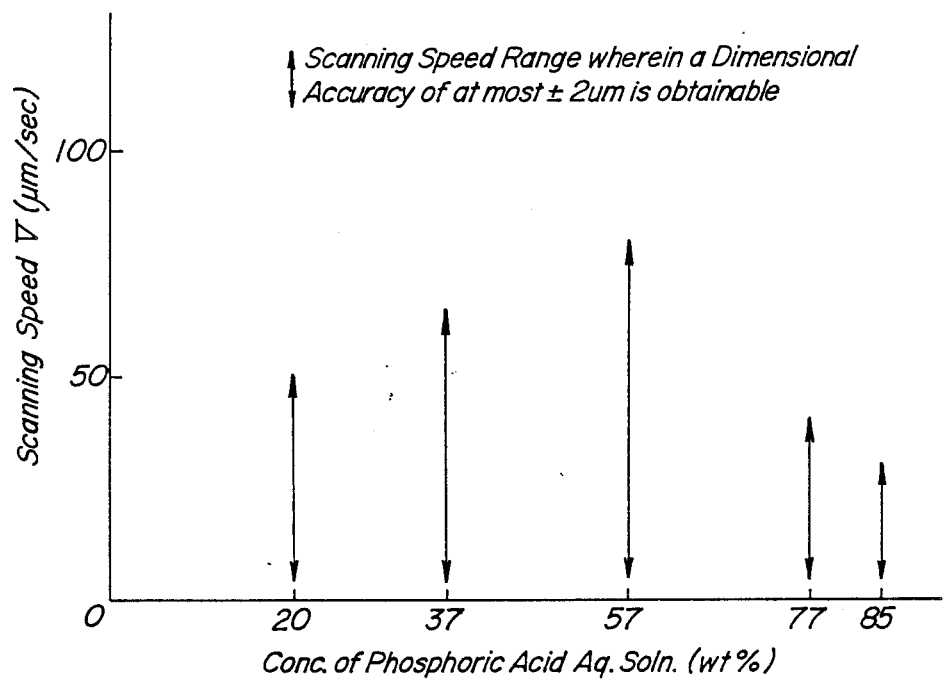
FIG. 4 is a graph illustrating the range of the scanning speed wherein a dimensional accuracy not lower than ±2 $\mu$m can be obtained, when the focused laser beam diameter is 4 $\mu$m, the laser power is kept constant at 400 mW and the concentration of the phosphoric acid aqueous solution is varied, in the first embodiment of the invention.

FIG. 4 is a graph illustrating the range of the scanning speed wherein a dimensional accuracy not lower than ±2 μm can be obtained, when the focused laser beam diameter is 4 μm, the laser power is kept constant at 400 mW and the concentration of the phosphoric acid aqueous solution is varied. It is seen that the range of the scanning speed for obtaining a dimensional accuracy not lower than ±2 μm depends upon the concentration. When the focused laser beam diameter is 4 μm and the laser power is 400 mW, it is seen that a concentration of the phosphoric acid aqueous solution lying between 37% and 77%, by weight, maximizes the range of scanning speed wherein a dimensional accuracy not lower than ±2 μm can be obtained.

FIGS. 3 and 4 show that, when the focused laser beam diameter is 4 μm, the ranges of machining condition for obtaining an etched depth of at least 50 μm with a dimensional accuracy not lower than ±2 are 10~800 mW for the laser power and 2~85 μm/sec for the scanning speed.

Figure 5:
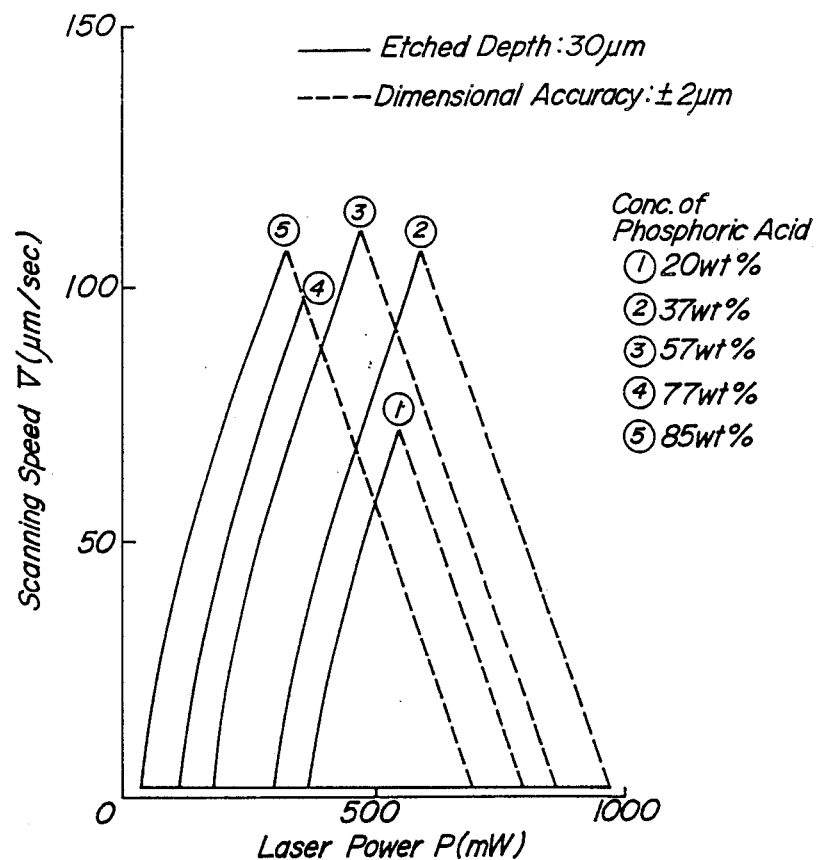
FIG. 5 is a graph illustrating the result of an experiment conducted with a laser beam having a focused beam diameter of 10 $\mu$m and various concentrations of the phosphoric acid aqueous solution, in the first embodiment of the invention.

FIG. 5 is a graph illustrating the result of an experiment conducted with a laser beam having a focused beam diameter of 10 μm and a liquid level of 500 μm, varying the concentration of the phosphoric acid aqueous solution to 20%, 37%, 57%, 77% and 85%, by weight. In FIG. 5, the solid lines delineate the upper limits of the scanning speed for obtaining an etched depth of 30 μm and the broken lines delineate the other upper limits for obtaining a dimensional accuracy of ±2 μm. It is seen from FIG. 5 that, when the laser power and scanning speed are kept constant, the etched depth increases as the concentration becomes higher, while the dimensional accuracy decreases as the concentration becomes higher or lower than 37% by weight.

It is seen that, for example, when the laser power is 600 mW and the scanning speed is 90 μm/sec, an etched depth of at least 30 μm with a dimensional accuracy not lower than ±2 μm can be obtained at a concentration of 37% by weight, whereas a dimensional accuracy not lower than ±2 μm cannot be obtained at concentrations of 57% and 20%, by weight. When the focused laser beam diameter is 10 μm, the ranges of machining condition for obtaining an etched depth of at least 30 μm with a dimensional accuracy not lower than ±2 μm are 30~1,000 mW for the laser power and 2~110 μm/sec for the scanning speed.

Figure 6:
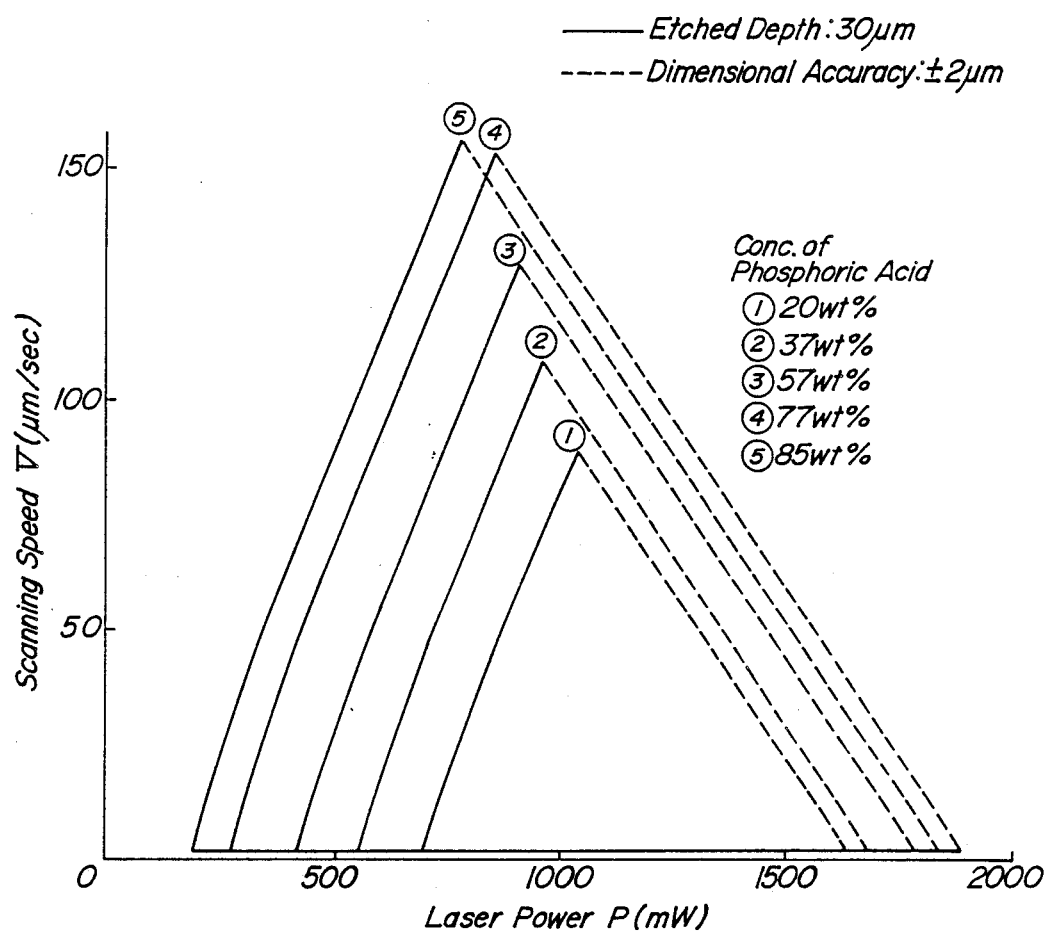
FIG. 6 is a graph illustrating the result of an experiment conducted with a laser beam having a focused beam diameter of 20 $\mu$m and various concentrations of the phosphoric acid aqueous solution, in the first embodiment of the invention.

FIG. 6 is a graph illustrating the result of an experiment conducted with a laser beam having a focused beam diameter of 50 μm and a liquid level of 500 μm, varying the concentration of the phosphoric acid aqueous solution to 20%, 37%, 57%, 77%, and 85%, by weight. In FIG. 6, the solid lines delineate the upper limits of the scanning speed for obtaining an etched depth of 30 μm and the broken lines delineate the other upper limits for obtaining a dimensional accuracy of ±2 μm. It is seen from FIG. 6 that, when the laser power and scanning speed are kept constant, the etched depth increases as the concentration becomes higher, while the dimensional accuracy decreases as the concentration becomes higher or lower than 77% by weight.

It is seen that, for example, when the laser power is 1,100 mW and the scanning speed is 110 μm/sec, an etched depth of at least 30 μm with a dimensional accuracy not lower than ±2 μm can be obtained at a concentration of 77% by weight, whereas a dimensional accuracy not lower than ±2 μm cannot be obtained at concentrations of 57% and 85%, by weight. When the focused laser beam diameter is 50 μm, the ranges of machining condition for obtaining an etched depth of at least 30 μm with a dimensional accuracy not lower than ±2 are 200~1,900 mW for the laser power and 2~160 μm/sec for the scanning speed.

As shown in FIGS. 3~6, it is seen that the range of machining condition depends upon the focused laser beam diameter and the concentration of the phosphoric acid aqueous solution. It is understood that the measures of determination of the machining condition may be: for increasing the etched depth, (1) to increase the laser power, (2) to decrease the scanning speed and (3) to increase the concentration; and for improving the dimensional accuracy, (1) to decrease the laser power, (2) to decrease the scanning speed and (3) to bring the concentration to 30~80% by weight. Further, in order to raise an aspect ratio (etched depth/etched width) of machined grooves, the focused laser beam diameter is recommended to be decreased.

Additionally, when a composite material composed of ferrite and a magnetic alloy, such as Sendust, Permalloy or the like, is machined, a satisfactorily effective machining can be performed by decreasing the focused laser beam diameter to 10 μm or less, increasing the power density and further increasing the concentration to at least 50% by weight, taking the high thermal conductivity of Sendust or Permalloy into consideration.

As described above, it is necessary for the determination of an adequate condition to judge synthetically the laser power, scanning speed, focused laser beam diameter and the concentration of the phosphoric acid aqueous solution, taking aimed etched depth, dimensional accuracy, etching speed, etching pattern, etc. into consideration.

② The second embodiment of the invention (ferrite core)

Figure 7:
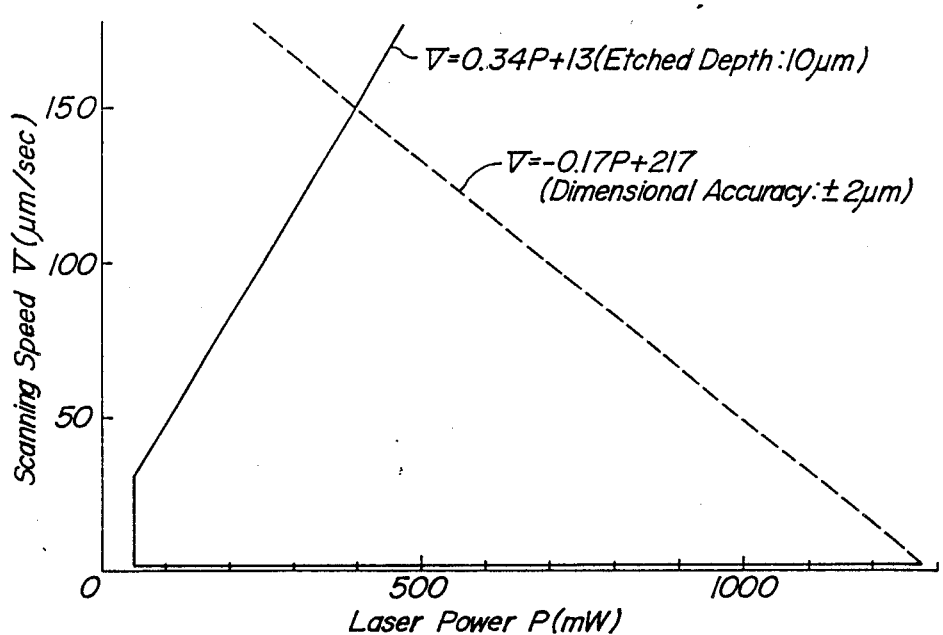
FIG. 7 is a graph illustrating the range of a condition wherein a track of a ferrite core for magnetic head is machined to an etched depth of at least 10 $\mu$m with a dimensional accuracy not lower than ±2 $\mu$m, in an alkali metal hydroxide aqueous solution, in the second embodiment of the invention.

FIG. 7 is a graph illustrating the range of a condition for machining a track of a ferrite core for magnetic head, having an etched depth of at least 10 μm with a dimensional accuracy not lower than ±2 μm, in an alkali metal hydroxide aqueous solution. It can be understood that, when the laser power P is kept constant in the range of 50~1,300 mW and the scanning speed V lies in the range of 2~150 μm/sec, the above range is defined by the condition: $V \leq 0.34P+13$ (solid line) which delineates the upper limit of the scanning speed for obtaining an etched depth of 10 μm and the condition: $V \leq -0.17P+217$ (broken line) which delineates the other upper limit of the scanning speed for obtaining a dimensional accuracy of ±2 μm.

It is understood from FIG. 7 that an etched depth of at least 10 μm with a dimensional accuracy not lower than ±2 μm can be obtained when the scanning speed lies in the range of 2~115 μm/sec and the laser power is, for example, 300 mW, whereas, when the scanning speed lies in the range between more than 115 μm/sec and 165 μm/sec, at the same power, an etched depth of at least 10 μm cannot be obtained, although a dimensional accuracy not lower than ±2 μm can be obtained. Further, it is understood that, when the scanning speed exceeds 165 μm/sec, even a dimensional accuracy not lower than ±2 μm cannot be obtained. Furthermore, it is understood that, when the laser power is 500 mW and the scanning speed lies in the range of 2~135 μm/sec, an etched depth of at least 10 μm with a dimensional accuracy not lower than ±2 μm can be obtained, whereas, when the scanning speed lies in the range between more than 135 μm and 185 μm/sec, at the same power, a dimensional accuracy not lower than ±2 μm cannot be obtained, although an etched depth of at least 10 μm can be obtained. Further, it is understood that, when the scanning speed exceeds 185 μm/sec, even an etched depth of at least 10 μm cannot be obtained.

The condition shown in the above FIG. 7 is based on the result of a experiment under conditions that the concentration of the potassium hydroxide or sodium hydroxide aqueous solution is 5~55% by weight and the focused laser beam diameter is not larger than 20 μm. However, even in the case where the laser power and scanning speed are kept constant, the etched depth and dimensional accuracy vary depending upon the concentration and focused laser beam diameter. Accordingly an adequate condition to achieve an aimed etched depth and dimensional accuracy must be selected in the range shown in the above FIG. 7, taking the concentration and focused laser beam diameter into further consideration.

Particularly, when the focused laser beam diameter is reduced, the laser power is preferred to be decreased so that the melts due to the heat of the laser beam may not exceed in amount the reaction products due to chemical reaction with potassium hydroxide or sodium hydroxide. Inversely, when the focused laser beam diameter is augmented, the laser power is preferred to be increased so that the laser-induced etching may take place efficiently.

Figure 8:
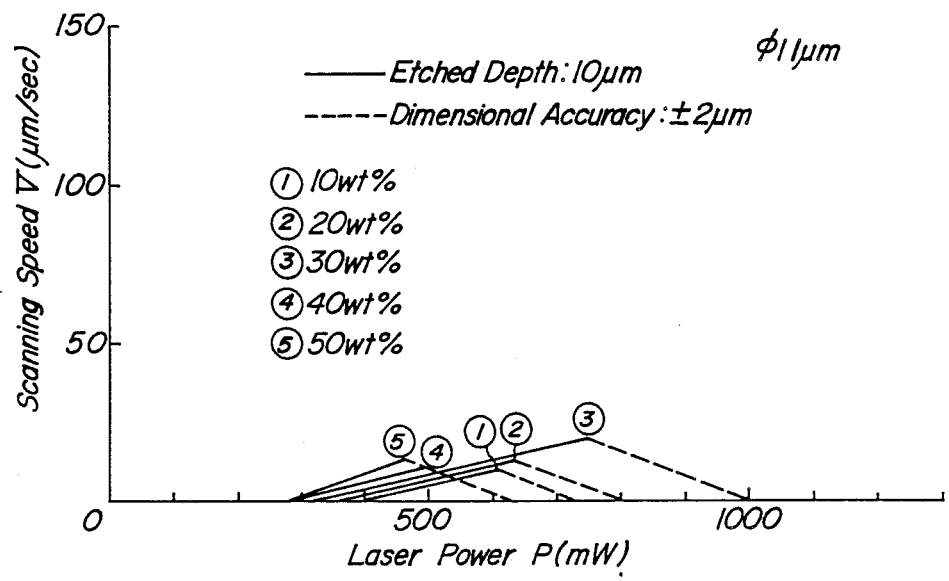
FIG. 8 is a graph illustrating the result of an experiment of machining a track of a ferrite core for magnetic head, conducted with a laser beam having a focused beam diameter of 11 $\mu$m and various concentrations of the potassium hydroxide aqueous solution, in the second embodiment of the invention.

In FIG. 8 there is shown the result of an experiment conducted using the apparatus shown in FIG. 1 wherein the liquid level is 500 μm, the focused laser beam diameter is 11 μm and the concentration of the potassium hydroxide aqueous solution is varied to 10%, 20%, 30%, 40% and 50%, by weight. The solid lines delineate the upper limits of the scanning speed for obtaining an etched depth of 10 μm and the broken lines delineate the other upper limits for obtaining a dimensional accuracy of ±2 μm. It is seen that, when the laser power and scanning speed are kept constant, the etched depth increases as the concentration becomes higher, while the dimensional accuracy decreases as the concentration becomes higher or lower than 30% by weight.

Since the upper limits of the etched depth and dimensional accuracy depend upon the concentration, it is understood that an adequate range of the machining condition varies.

It is seen that, for example, when the laser power is 700 mW and the scanning speed is 10 μm/sec, an etched depth of at least 10 μm with a dimensional accuracy not lower than ±2 μm can be obtained at a concentration of 30% by weight, whereas a dimensional accuracy not lower than ±2 μm cannot be obtained at a concentration of 20% by weight. Further, it is seen that, even when the concentration is 40% by weight, a dimensional accuracy not lower than ±2 μm cannot be obtained.

FIG. 9 is a graph illustrating the range of the scanning speed wherein a dimensional accuracy not lower than ±2 μm can be obtained, when the focused laser beam diameter is 11 μm, the laser power is kept constant at 550 mW and the concentration of the potassium hydroxide aqueous solution is varied. It is seen that the range of the scanning speed for obtaining a dimensional accuracy not lower than ±2 μm depends upon the concentration. It is seen that, when the focused laser beam diameter is 11 μm and the laser power is 550 mW, a concentration of the potassium hydroxide aqueous solution lying between 20% and 40%, by weight, maximizes the range of scanning speed wherein a dimensional accuracy not lower than ±2 μm can be obtained.

FIGS. 8 and 9 show that, when the focused laser beam diameter is 11 μm, the ranges of machining condition for obtaining an etched depth of at least 10 μm with a dimensional accuracy not lower than ±2 are 300~1,000 mW for the laser power and 2~20 μm/sec for the scanning speed.

FIG. 10 is a graph illustrating the result of an experiment conducted with a laser beam having a focused beam diameter of 4 μm and a liquid level of 500 μm, varying the concentration of the potassium hydroxide aqueous solution to 10%, 20%, 30%, 40%, and 50%, by weight. In FIG. 10, the solid lines delineate the upper limits of the scanning speed for obtaining an etched depth of 10 μm and the broken lines delineate the other upper limits for obtaining a dimensional accuracy of ±2 μm. It is seen from FIG. 10 that, when the laser power and scanning speed are kept constant, the etched depth increases as the concentration becomes higher, while the dimensional accuracy decreases as the concentration becomes higher or lower than 30% by weight.

It is seen that, for example, when the laser power is 500 mW and the scanning speed is 40 μm/sec, an etched depth of at least 10 μm with a dimensional accuracy not lower than ±2 μm can be obtained at a concentration of 30% by weight, whereas a dimensional accuracy not lower than ±2 μm cannot be obtained at concentrations of 20% and 40%, by weight. When the focused laser beam diameter is 4 μm, the ranges of machining condition for obtaining an etched depth of at least 10 μm with a dimensional accuracy not lower than ±2 μm are 200~1,000 mW for the laser power and 2~65 μm/sec for the scanning speed.

Figure 11:
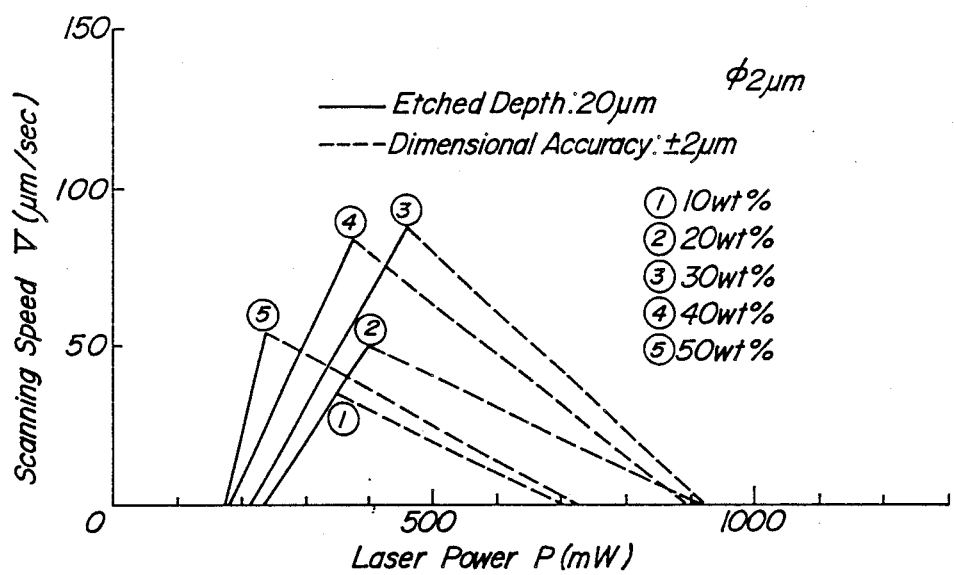
FIG. 11 is a graph illustrating the result of an experiment of machining a track of a ferrite core for magnetic head, conducted with a laser beam having a focused beam diameter of 2 $\mu$m and various concentrations of the potassium hydroxide aqueous solution, in the second embodiment of the invention.

FIG. 11 is a graph illustrating the result of an experiment conducted with a laser beam having a focused beam diameter of 2 μm and a liquid level of 500 μm, varying the concentration of the potassium hydroxide aqueous solution to 10%, 20%, 30%, 40%, and 50%, by weight. In FIG. 11, the solid lines delineate the upper limits of the scanning speed for obtaining an etched depth of 20 μm and the broken lines delineate the other upper limits for obtaining a dimensional accuracy of ±2 μm. It is seen from FIG. 11 that, when the laser power and scanning speed are kept constant, the etched depth increases as the concentration becomes higher, while the dimensional accuracy decreases as the concentration becomes higher or lower than 30% by weight.

It is seen that, for example, when the laser power is 500 mW and the scanning speed is 70 μm/sec, an etched depth of at least 20 μm with a dimensional accuracy not lower than ±2 μm can be obtained at a concentration of 30% by weight, whereas a dimensional accuracy not lower than ±2 μm cannot be obtained at concentrations of 20% and 40%, by weight. When the focused laser beam diameter is 2 μm, the ranges of machining condition for obtaining an etched depth of at least 20 μm with a dimensional accuracy not lower than ±2 are 175~925 mW for the laser power and 2~90 μm/sec for the scanning speed.

Figure 12:
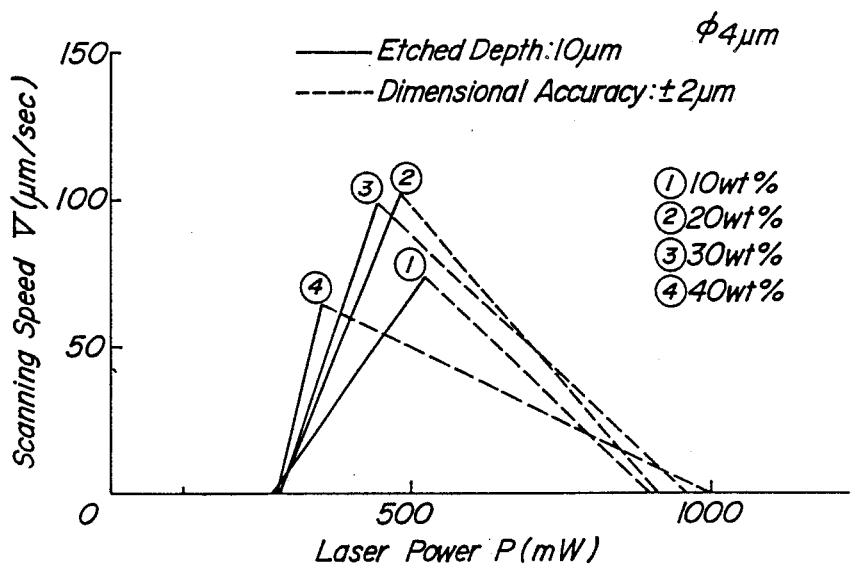
FIG. 12 is a graph illustrating the result of an experiment of machining a track of a ferrite core for magnetic head, conducted with a laser beam having a focused beam diameter of 4 $\mu$m and various concentrations of the sodium hydroxide aqueous solution, in the second embodiment of the invention.

FIG. 12 is a graph illustrating the result of an experiment conducted with a laser beam having a focused beam diameter of 4 μm and a liquid level of 500 μm in the apparatus shown in FIG. 1, varying the concentration of the sodium hydroxide aqueous solution to 10%, 20%, 30%, and 40%, by weight. The solid lines delineate the upper limits of the scanning speed for obtaining an etched depth of 10 μm and the broken lines delineate the other upper limits for obtaining a dimensional accuracy of ±2 μm. It is seen that, when the laser power and scanning speed are kept constant, the etched depth increases as the concentration becomes higher, while the dimensional accuracy decreases as the concentration becomes higher or lower than 20% by weight.

It is seen that, since the upper limit of the etched depth and the dimensional accuracy depend upon the concentration, an adequate range of machining condition varies.

It is seen that, for example, when the laser power is 500 mW and the scanning speed is 95 μm/sec, an etched depth of at least 10 μm with a dimensional accuracy not lower than ±2 μm can be obtained at a concentration of 20% by weight, whereas a dimensional accuracy not lower than ±2 μm cannot be obtained at a concentration of 10%, by weight. Further, it is seen that a dimensional accuracy not lower than ±2 μm cannot be obtained even when the concentration is 30% by weight.

FIG. 13 is a graph illustrating the range of scanning speed for obtaining a dimensional accuracy not lower than ±2 μm when the focused laser beam diameter is 4 μm, the laser power is kept constant at 400 mW and the concentration of the sodium hydroxide aqueous solution is varied. It is seen that the range of the scanning speed for obtaining a dimensional accuracy not lower than ±2 μm varies depending upon the concentration. It is seen that, when the focused laser beam diameter is 4 μm and the laser power is 400 mW, a concentration of the sodium hydroxide aqueous solution lying between 10% and 30%, by weight, maximizes the range of the scanning speed for obtaining a dimensional accuracy not lower than ±2 μm. FIGS. 12 and 13 show that, when the focused laser beam diameter is 4 μm, the ranges of machining condition for obtaining an etched depth of at least 10 μm with a dimensional accuracy not lower than ±2 μm are 260~1,000 mW for the laser power and 2~105 μm/sec for the scanning speed.

FIG. 14 is a graph illustrating the result of an experiment conducted with a laser beam having a focused beam diameter of 2 μm and a liquid level of 500 μm, varying the concentration of the sodium hydroxide aqueous solution to 10%, 20%, 30%, and 40%, by weight. In FIG. 14, the solid lines delineate the upper limits of the scanning speed for obtaining an etched depth of 20 μm and the broken lines delineate the other upper limits for obtaining a dimensional accuracy of ±2 μm. It is seen from FIG. 14 that, when the laser power and scanning speed are kept constant, the etched depth increases as the concentration becomes higher, while the dimensional accuracy decreases as the concentration becomes higher or lower than 30% by weight.

It is seen that, for example, when the laser power is 400 mW and the scanning speed is 40 μm/sec, an etched depth of at least 20 μm with a dimensional accuracy not lower than ±2 μm can be obtained at a concentration of 30% by weight, whereas a dimensional accuracy not lower than ±2 μm cannot be obtained at concentrations of 20% and 40%, by weight. When the focused laser beam diameter is 2 μm, the ranges of machining condition for obtaining an etched depth of at least 20 μm with a dimensional accuracy not lower than ±2 μm are 150~525 mW for the laser power and 2~55 μm/sec for the scanning speed.

③ The third embodiment of the invention (Sendust core)

FIG. 15 is a graph illustrating the range of a condition for machining a track of a Sendust core for magnetic head, having an etched depth of at least 10 μm with a dimensional accuracy not lower than ±2 μm, in an alkali metal hydroxide aqueous solution. It can be understood that, when the laser power P is kept constant in the range of 50~1,000 mW and the scanning speed V lies in the range of 2~70 μm/sec, the above range is defined by the conditions: $V \leq 0.1P+10$ (solid line) which delineates the upper limit of the scanning speed for obtaining an etched depth of 10 μm and the condition: $V \leq -0.18P+180$ (broken line) which delineates the upper limit of the scanning speed for obtaining a dimensional accuracy of ±2 μm.

It is understood from FIG. 15 that an etched depth of at least 10 μm with a dimensional accuracy not lower than 2 μm can be obtained when the scanning speed lies in the range of 2~60 μm/sec and the laser power is, for example, 500 mW, whereas, when the scanning speed lies in the range between more than 60 μm/sec and 88 μm/sec, at the same power, an etched depth of at least 10 μm cannot be obtained, although a dimensional accuracy not lower than ±2 μm can be obtained. Further, it is understood that, when the scanning speed exceeds 88 μm/sec, even a dimensional accuracy not lower than ±2 μm cannot be obtained. Furthermore, it is understood that, when the laser power is 700 mW and the scanning speed lies in the range of 2~52 μm/sec, an etched depth of at least 10 μm with a dimensional accuracy not lower than ±2 μm can be obtained, whereas, when the scanning speed lies in the range between more than 52 μm/sec and 80 μm/sec, at the same power, a dimensional accuracy not lower than ±2 μm cannot be obtained, although an etched depth of at least 10 μm can be obtained. Further, it is understood that, when the scanning speed exceeds 80 μm/sec, even an etched depth of at least 10 μm cannot be obtained.

The condition shown in the above FIG. 15 is based on the result of an experiment under conditions that the concentration of the potassium hydroxide or sodium hydroxide aqueous solution is 5~55% by weight and the focused laser beam diameter is not larger than 20 μm. However, even in the case where the laser power and scanning speed are kept constant, the etched depth and dimensional accuracy vary depending upon the concentration and focused laser beam diameter. Accordingly, an adequate condition to achieve an aimed etched depth and dimensional accuracy must be selected in the range shown in the above FIG. 15, taking the concentration and focused laser beam diameter into further consideration.

Particularly, since Sendust is high in thermal conductivity, it is preferred to reduce the focused laser beam diameter to prevent diffusion of the heat.

In FIG. 16 there is shown the result of an experiment conducted using the apparatus shown in FIG. 1 wherein the liquid level is 500 μm, the focused laser beam diameter is 11 μm and the concentration of the potassium hydroxide aqueous solution is varied to 10%, 20%, 30%, 40% and 50%, by weight. The solid lines delineate the upper limits of the scanning speed for obtaining an etched depth of 10 μm and the broken lines delineate the other upper limits for obtaining a dimensional accuracy of ±2 μm. It is seen that, when the laser power and scanning speed are kept constant, the etched depth increases as the concentration becomes higher, while the dimensional accuracy decreases as the concentration becomes higher or lower than 30% by weight.

Since the upper limits of the etched depth and dimensional accuracy depend upon the concentration, it is understood that an adequate range of the machining condition varies.

It is seen that, for example, when the laser power is 625 mW and the scanning speed is 10 μm/sec, an etched depth of at least 10 μm with a dimensional accuracy not lower than ±2 μm can be obtained at a concentration of 30% by weight, whereas a dimensional accuracy not lower than ±2 μm cannot be obtained at a concentration of 20% by weight. Further, it is seen that, even when the concentration is 40% by weight, a dimensional accuracy not lower than ±2 μm cannot be obtained.

FIG. 17 is a graph illustrating the range of the scanning speed wherein a dimensional accuracy not lower than ±2 μm can be obtained, when the focused laser beam diameter is 11 μm, the laser power is kept constant at 550 mW and the concentration of the potassium hydroxide aqueous solution is varied. It is seen that the range of the scanning speed for obtaining a dimensional accuracy not lower than ±2 μm depends upon the concentration. It is seen that, when the focused laser beam diameter is 11 μm and the laser power is 550 mW, a concentration of the potassium hydroxide aqueous solution lying between 20% and 40%, by weight, maximizes the range of scanning speed wherein a dimensional accuracy not lower than ±2 μm can be obtained.

FIGS. 16 and 17 show that, when the focused laser beam diameter is 11 μm, the ranges of machining condition for obtaining an etched depth of at least 10 μm with a dimensional accuracy not lower than ±2 are 150~750 mW for the laser power and 2~25 μm/sec for the scanning speed.

FIG. 18 is a graph illustrating the result of an experiment conducted with a laser beam having a focused beam diameter of 4 μm and a liquid level of 500 μm, varying the concentration of the potassium hydroxide aqueous solution to 10%, 20%, 30%, 40%, and 50%, by weight. In FIG. 18, the solid lines delineate the upper limits of the scanning speed for obtaining an etched depth of 10 μm and the broken lines delineate the other upper limits for obtaining a dimensional accuracy of ±2 μm. It is seen from FIG. 18 that, when the laser power and scanning speed are kept constant, the etched depth increases as the concentration becomes higher, while the dimensional accuracy decreases as the concentration becomes higher or lower than 30% by weight.

It is seen that, for example, when the laser power is 600 mW and the scanning speed is 40 μm/sec, an etched depth of at least 10 μm with a dimensional accuracy not lower than ±2 μm can be obtained at a concentration of 30% by weight, whereas a dimensional accuracy not lower than ±2 μm cannot be obtained at concentrations of 20% and 40%, by weight. When the focused laser beam diameter is 4 μm, the ranges of machining condition for obtaining an etched depth of at least 10 μm with a dimensional accuracy not lower than ±2 μm are 100~875 mW for the laser power and 2~50 μm/sec for the scanning speed.

Figure 19:
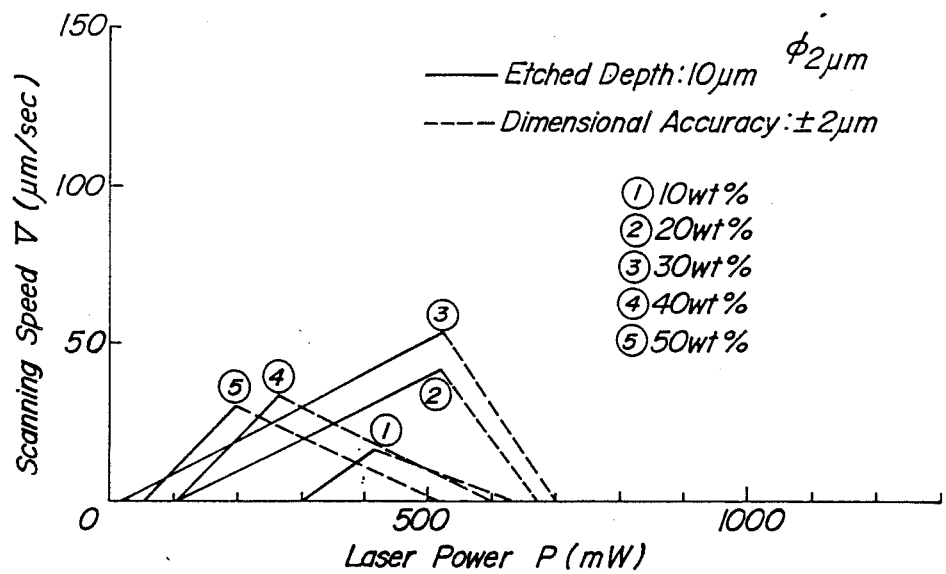
FIG. 19 is a graph illustrating the result of an experiment of machining a track of a Sendust core for magnetic head, conducted with a laser beam having a focused beam diameter of 2 $\mu$m and various concentrations of the potassium hydroxide aqueous solution, in the third embodiment of the invention.

FIG. 19 is a graph illustrating the result of an experiment conducted with a laser beam having a focused beam diameter of 2 μm and a liquid level of 500 μm, varying the concentration of the potassium hydroxide aqueous solution to 10%, 20%, 30%, 40%, and 50%, by weight. In FIG. 19, the solid lines delineate the upper limits of the scanning speed for obtaining an etched depth of 10 μm and the broken lines delineate the other upper limits for obtaining a dimensional accuracy of ±2 μm. It is seen from FIG. 19 that, when the laser power and scanning speed are kept constant, the etched depth increases as the concentration becomes higher, while the dimensional accuracy decreases as the concentration becomes higher or lower than 30% by weight.

It is seen that, for example, when the laser power is 550 mW and the scanning speed is 40 μm/sec, an etched depth of at least 10 μm with a dimensional accuracy not lower than ±2 μm can be obtained at a concentration of 30% by weight, whereas a dimensional accuracy not lower than ±2 μm cannot be obtained at concentrations of 20% and 40%, by weight. When the focused laser beam diameter is 2 μm, the ranges of machining condition for obtaining an etched depth of at least 10 μm with a dimensional accuracy not lower than ±2 are 10~700 mW for the laser power and 2~55 μm/sec for the scanning speed.

As shown in FIGS. 7~14 and 15~19, it is seen that the range of machining condition depends upon the focused laser beam diameter and the concentration of the alkali metal hydroxide aqueous solution. It is understood that the measures of determination of the condition for machining a track of a ferrite or Sendust core for magnetic head may be: for increasing the etched depth, (1) to increase the laser power, (2) to decrease the scanning speed and (3) to increase the concentration; and for improving the dimensional accuracy, (1) to decrease the laser power, (2) to decrease the scanning speed and (3) to bring the concentration to 20~40% by weight. Further, in order to raise an aspect ratio (etched depth/etched width) of machined grooves, the focused laser beam diameter is recommended to be decreased.

Additionally, when a composite material composed of ferrite and Sendust is machined, the difference in etching rate between ferrite and Sendust must be further taken into consideration. As it affects directly on the dimensional accuracy, the difference of the width of the machined grooves between ferrite and Sendust is preferably not larger than 2 μm, more preferably not larger than 1 μm.

As the thermal conductivity of ferrite is lower than that of Sendust, the width of the machined grooves of the ferrite is larger than that of Sendust in the case where they are machined at the same power. Further, with respect to the etching rate for alkali metal hydroxide, Sendust is higher than the ferrite, so that the width of the machined grooves of Sendust is larger in the case where Sendust and ferrite are machined at the same concentration of the etching solution. An elaborate combination of the above two relations allows the ferrite and Sendust to be machined to the same width of the groove.

④ The fourth embodiment of the invention (ferrite/Sendust composite core)

Figure 20:
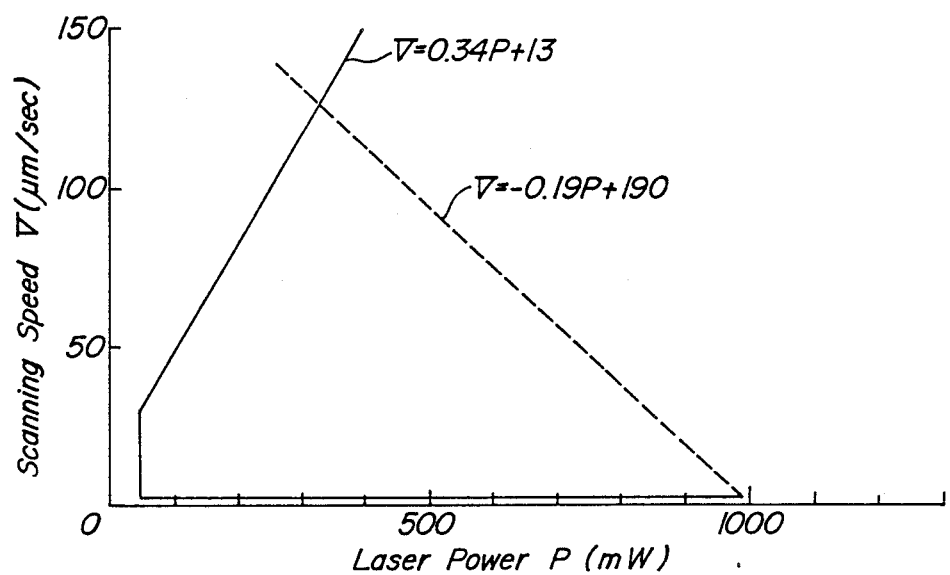
FIG. 20 is a graph illustrating the range of a condition wherein a track of a ferrite/Sendust composite core for magnetic head is machined to an etched depth of at least 10 $\mu$m with a dimensional accuracy not lower than ±2 $\mu$m, in an alkali metal hydroxide aqueous solution, in the fourth embodiment of the invention.

FIG. 20 is a graph illustrating the range of a condition for machining a track having an etched depth of at least 10 μm with a dimensional accuracy not lower than ±2 μm, on a core for magnetic head composed of ferrite and Sendust, in an alkali metal hydroxide aqueous solution. It can be understood that, when the laser power P is kept constant in the range of 50~1,000 mW and the scanning speed V lies in the range of 2~125 μm/sec, the above range is defined by the condition: $V \leq 0.34P + 13$ (solid line) which delineates the upper limit of the scanning speed for obtaining an etched depth of 10 μm, and the condition: $V \leq -0.19P + 190$ (broken line) which delineates the other upper limit of the scanning speed for obtaining a dimensional accuracy of ±2 μm.

It is understood from FIG. 20 that an etched depth of at least 10 μm with a dimensional accuracy not lower than ±2 μm can be obtained when the scanning speed lies in the range of 2~115 μm/sec and the laser power is, for example, 300 mW, whereas, when the scanning speed lies in the range between more than 115 μm/sec and 130 μm/sec, at the same power, an etched depth of at least 10 μm cannot be obtained, although a dimensional accuracy not lower than ±2 μm can be obtained. Further, it is understood that when the scanning speed exceeds 130 μm/sec, even a dimensional accuracy not lower than ±2 μm cannot be obtained. Furthermore, it is understood that, when the laser power is 400 mW and the scanning speed lies in the range of 2~115 μm/sec, an etched depth of at least 10 μm with a dimensional accuracy not lower than ±2 μm can be obtained, whereas, when the scanning speed lies in the range between more than 115 μm/sec and 150 μm/sec, at the same power, a dimensional accuracy not lower than ±2 μm cannot be obtained, although an etched depth of at least 10 μm can be obtained. Further, it is understood that, when the scanning speed exceeds 150 μm/sec, even an etched depth of at least 10 μm cannot be obtained.

The condition shown in the above FIG. 20 is based on the result of an experiment under conditions that the concentration of the potassium hydroxide or sodium hydroxide aqueous solution is 5~55% by weight and the focused laser beam diameter is not larger than 20 μm. However, even in the case where the laser power and scanning speed are kept constant, the etched depth and dimensional accuracy vary depending upon the concentration and focused laser beam diameter. Accordingly, an adequate condition to achieve an aimed etched depth and dimensional accuracy must be selected in the range shown in the above FIG. 20, taking the concentration and focused laser beam diameter into further consideration.

In FIG. 21 there is shown the result of an experiment conducted using the apparatus shown in FIG. 1 wherein the liquid level is 500 μm, the focused laser beam diameter is 11 μm and the concentration of the potassium hydroxide aqueous solution is varied to 10%, 20%, 30%, 40% and 50%, by weight. It is seen that, when the focused laser beam diameter is 11 μm, the concentration of 10% by weight allows the ferrite and Sendust to be machined to the same groove width. The solid line delineates the upper limit of the scanning speed for obtaining an etched depth of 10 μm and the broken line delineates the other upper limit for obtaining a dimensional accuracy of ±2 μm. The chain line delineates the third upper limit for obtaining a difference of etched groove width between ferrite and Sendust of not exceeding 2 μm. For example, when the laser power is 550 mW, an etched depth of at least 10 μm can be obtained at a scanning speed of 5 μm/sec, whereas an etched depth of at least 10 μm cannot be obtained at a scanning speed of 10 μm/sec. Alternatively, it is seen that, when the laser power is 650 mW, a dimensional accuracy not lower than ±2 μm can be obtained at a scanning speed of 5 μm/sec, whereas a dimensional accuracy not lower than ±2 μm cannot be obtained at a scanning speed of 10 μm/sec.

Further, it is seen that, when the laser power is 475 mW, the difference of machined groove width between ferrite and Sendust machined at a scanning speed of 2

μm/sec is not larger than 2 μm, whereas, when the scanning speed is 5 μm/sec, a machined groove width difference of not larger than 2 μm cannot be obtained. When the focused laser beam diameter is 11 μm, the ranges of the machining condition for obtaining an etched depth of at least 10 μm with a dimensional accuracy not lower than ±2 μm are 450~750 mW for the laser power and 2~10 μm/sec for the scanning speed.

FIG. 22 shows the result of an experiment conducted under conditions that the liquid level is 500 μm, the focused laser beam diameter is 4 μm and the concentration of the potassium hydroxide aqueous solution is varied to 10%, 20%, 30%, 40% and 50%, by weight. In FIG. 22, the solid lines delineate the upper limits of the scanning speed for obtaining an etched depth of 10 μm and the broken lines delineate the other upper limits for obtaining a dimensional accuracy of ±2 μm. The chain line delineates the third upper limit for obtaining a difference of etched groove width between ferrite and Sendust of not exceeding 2 μm. It is seen from FIG. 22 that, when the focused laser beam diameter is 4 μm, the concentration lying between 10% and 40%, by weight, allows the ferrite and Sendust to be machined to the same groove width.

Further, it is seen that, when the laser power and scanning speed are kept constant, the etched depth increases as the concentration becomes higher, while the dimensional accuracy decreases as the concentration becomes higher or lower than 30% by weight.

It is seen that, for example, when the laser power is 400 mW and the scanning speed is 30 μm/sec, an etched depth of at least 10 μm with a dimensional accuracy not lower than ±2 μm can be obtained at a concentration of 30% by weight, whereas a dimensional accuracy not lower than ±2 μm cannot be obtained at concentrations of 20% and 40%, by weight. When the focused laser beam diameter is 4 μm, the ranges of a machining condition for obtaining an etched depth of at least 10 μm with a dimensional accuracy not lower than ±2 μm are 275~1,000 mW for the laser power and 2~65 μm/sec for the scanning speed.

Figure 23:
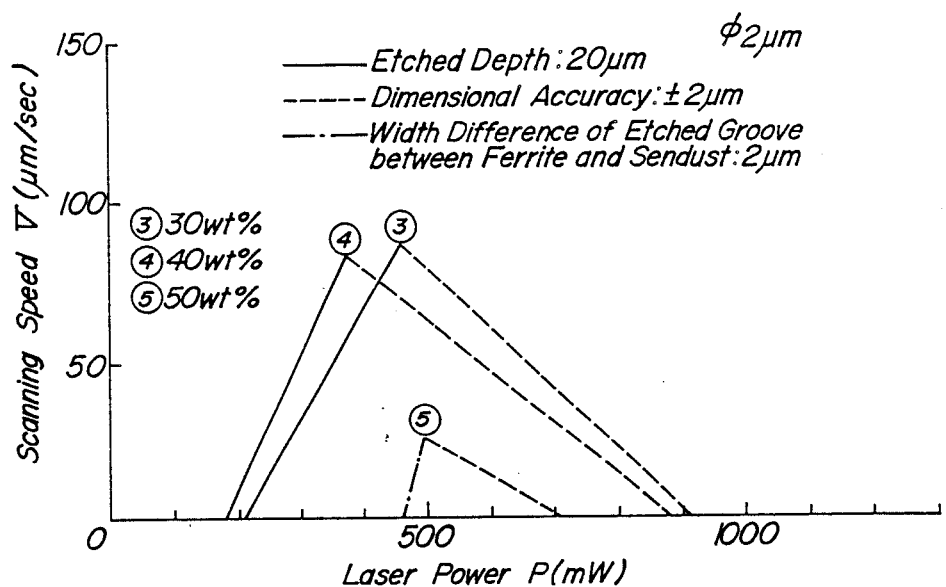
FIG. 23 is a graph illustrating the result of an experiment of machining a track of a ferrite/Sendust composite core for magnetic head, conducted with a laser beam having a focused beam diameter of 2 μm and various concentrations of the potassium hydroxide aqueous solution, in the fourth embodiment of the invention.

FIG. 23 shows the result of an experiment conducted under conditions that the liquid level is 500 μm, the focused laser beam diameter is 2 μm and the concentration of the potassium hydroxide aqueous solution is varied to 10%, 20%, 30%, 40% and 50%, by weight. In FIG. 23, the solid lines delineate the upper limits of the scanning speed for obtaining an etched depth of 20 μm and the broken lines delineate the other upper limits for obtaining a dimensional accuracy of ±2 μm. The chain line delineates the third upper limit for obtaining a difference of etched groove width between ferrite and Sendust of 2 μm or less. It is seen from FIG. 23 that, when the focused laser beam diameter is 2 μm, the concentration lying between 30% and 50%, by weight, allows the ferrite and Sendust to be machined to the same groove width.

Further, it is seen that, when the laser power and scanning speed are kept constant, the etched depth increases as the concentration becomes higher, while the dimensional accuracy decreases as the concentration becomes higher or lower than 30% by weight.

It is seen that, for example, when the laser power is 600 mW and the scanning speed is 50 μm/sec, an etched depth of at least 20 μm with a dimensional accuracy not lower than ±2 μm can be obtained at a concentration of 30% by weight, whereas a dimensional accuracy not lower than ±2 μm cannot be obtained at concentrations of 40% and 50%, by weight. When the focused laser beam diameter is 2 μm, the ranges of a machining condition for obtaining an etched depth of at least 20 μm with a dimensional accuracy not lower than ±2 μm are 175~925 for the laser power and 2~90 μm/sec for the scanning speed.

Figure 24:
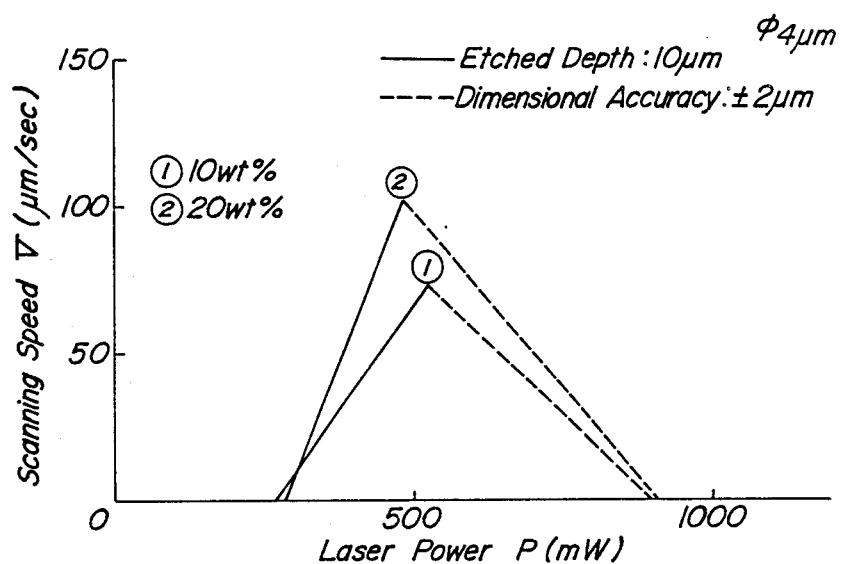
FIG. 24 is a graph illustrating the result of an experiment of machining a track of a ferrite/Sendust composite core for magnetic head, conducted with a laser beam having a focused beam diameter of 4 μm and various concentrations of the sodium hydroxide aqueous solution, in the fourth embodiment of the invention.

FIG. 24 shows the result of an experiment conducted under conditions that the liquid level is 500 μm, the focused laser beam diameter is 4 μm and the concentration of the sodium hydroxide aqueous solution is varied to 10%, 20%, 30%, and 40%, by weight. In FIG. 24, the solid lines delineate the upper limits of the scanning speed for obtaining an etched depth of 10 μm and the broken lines delineate the other upper limits for obtaining a dimensional accuracy of ±2 μm, which shows only the range wherein the difference of etched groove width between ferrite and Sendust is not exceeding 2 μm. It is seen from FIG. 24 that, when the focused laser beam diameter is 4 μm, the concentration lying between 10% and 20%, by weight, allows the ferrite and Sendust to be machined to the same groove width. Further, when the laser power and scanning speed are kept constant, the etched depth increases as the concentration becomes higher.

It is seen that, for example, when the laser power is 400 mW and the scanning speed is 50 μm/sec, an etched depth of at least 10 μm with a dimensional accuracy not lower than ±2 μm can be obtained at a concentration of 20% by weight, whereas an etched depth of at least 10 μm cannot be obtained at a concentration of 10%, by weight. When the focused laser beam diameter is 4 μm, the ranges of a machining condition for obtaining an etched depth of at least 10 μm with a dimensional accuracy not lower than ±2 are 250~925 mW for the laser power and 2~105 μm/sec for the scanning speed.

FIG. 25 shows the result of an experiment conducted under conditions that the liquid level is 500 μm, the focused laser beam diameter is 2 μm and the concentration of the sodium hydroxide aqueous solution is varied to 10%, 20%, 30%, and 40%, by weight. In FIG. 25, the solid lines delineate the upper limits of the scanning speed for obtaining an etched depth of 20 μm and the broken lines delineate the other upper limits for obtaining a dimensional accuracy of ±2 μm, which shows only the range wherein the difference of etched groove width between ferrite and Sendust is not exceeding 2 μm. It is seen from FIG. 25 that, when the focused laser beam diameter is 2 μm, the concentration lying between 10% and 30%, by weight, allows the ferrite and Sendust to be machined to the same groove width.

Further, when the laser power and scanning speed are kept constant, the dimensional accuracy becomes higher as the concentration increases up to 30% by weight. It is seen that, for example, when the laser power is 400 mW and the scanning speed is 40 μm/sec, an etched depth of at least 20 μm with a dimensional accuracy not lower than ±2 μm can be obtained at a concentration of 30% by weight, whereas a dimensional accuracy not lower than ±2 μm cannot be obtained at concentrations of 10% and 20%, by weight. When the focused laser beam diameter is 2 μm, the ranges of a machining condition for obtaining an etched depth of at least 20 μm with a dimensional accuracy not lower than ±2 are 150~525 mW for the laser power and 2~55 μm/sec for the scanning speed.

As shown in FIGS. 20~25, it is seen that the range of machining condition depends upon the focused laser beam diameter and the concentration of the alkali metal hydroxide aqueous solution, such as potassium hydroxide or sodium hydroxide. It is understood that the measures of the determination of a condition for machining a track of a composite core, composed of ferrite and Sendust, for magnetic head may be: for increasing the etched depth, (1) to increase the laser power, (2) to decrease the scanning speed and (3) to increase the concentration; and for improving the dimensional accuracy, (1) to decrease the laser power, (2) to decrease the scanning speed and (3) to bring the concentration to 10~40% by weight. Further, in order to raise an aspect ratio (etched depth/etched width) of machined grooves, the focused laser beam diameter is recommended to be decreased. Further, in order to equalize the machined groove widths of ferrite and Sendust, the focused laser beam diameter is recommended to be decreased, and it is preferred to increase the concentration as the focused diameter decreases. Additionally, when the laser power is increased, the concentration is preferred to be also increased.

As described above, it is necessary for the determination of an adequate machining condition to judge synthetically the laser power, scanning speed, focused laser beam diameter and the concentration of the etching solution, taking aimed etched depth, dimensional accuracy, etching speed, etching pattern, etc. into consideration.

(3) Production of a core for magnetic head.

Figure 26A:
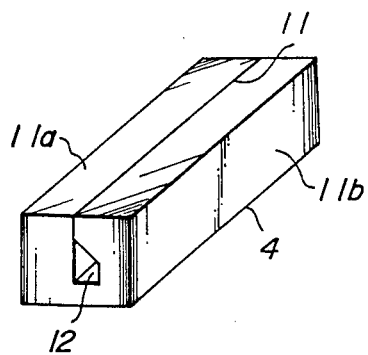
FIGS. 26a-26d show a flow diagram illustrating the procedure in the case where the first embodiment of the present invention is applied to the production of a core for VTR magnetic head.
Figure 26B:
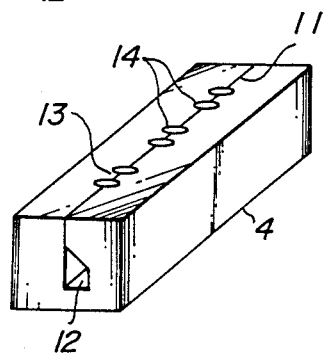
Figure 26C:
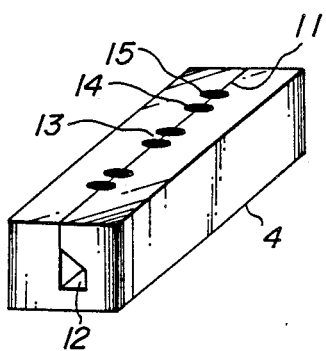
Figure 26D:
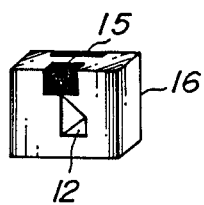

FIGS. 26a~26d show a flow diagram illustrating the procedure in the case where the first embodiment of the present invention is applied to the production of a core for VTR magnetic head. On the outset, as shown in FIG. 26a, a ferrite bar 11a and a ferrite bar 11b having a coil turn hole 12 are bonded with each other by means of a glass-cementing, a solid phase reaction or the like, to form a gapped bar 4 having magnetic gap 11. Then, the prepared gapped bar 4 is set in the apparatus shown in FIG. 1, and a plural number of grooves 14 defining a track width 13 are machined on the gapped bar 4 as shown in FIG. 26b, under conditions such that the laser power is 400 mW, the scanning speed is 20 μm/sec, the focused laser beam diameter is 10 μm, the concentration of phosphoric acid aqueous solution is 77% by weight and the liquid level is 500 μm. Thereafter, as shown in FIG. 26c, glass 15 is embedded in the machined grooves 14, followed by grinding to a predetermined dimension. Lastly, cores having a predetermined width are cut out from the processed gapped bar. Thus, cores for VTR magnetic head as shown in FIG. 26d are obtained.

FIGS. 27a~27g show a flow diagram illustrating the procedure in the case where the fourth embodiment of the present invention is applied to the production of a composite core for VTR magnetic head, composed of ferrite and Sendust.

On the outset, as shown in FIG. 27a, a ferrite bar 11a and a ferrite bar 11b having a groove 12', which corresponds to a coil turn hole, are prepared. As shown in FIG. 27b, Sendust membranes 18, 5 μm thick, are formed on the face to face surfaces 17 of the ferrite bar 11a and ferrite bar 11b. Further, on the membranes, a non-magnetic layer 19, such as SiO$_2$ or the like, which is to define a magnetic gap, is formed with a thickness equal to a predetermined magnetic gap width, as shown in FIG. 27c. Then, these bars are combined and bonded with each other by means of glass-soldering to form a gapped bar 4 having a magnetic gap 19 as shown in FIG. 27d. Thereafter, the prepared gapped bar 4 is set in the apparatus shown in FIG. 1, and a plural number of grooves 14 defining a track width are machined on the gapped bar 4 as shown in FIG. 27e, under conditions of a laser power of 500 mW, a scanning speed of 30 μm/sec, a focused laser beam diameter of 4 μm, a concentration of potassium hydroxide aqueous solution of 30% by weight and a liquid level of 500 μm. Then, as shown in FIG. 27f, glass 15 is embedded in the machined grooves 14, followed by grinding to a predetermined dimension. Lastly, cores having a predetermined width are cut out from the processed gapped bar. Thus, a core for VTR magnetic head as shown in FIG. 27g is obtained.

On the thus obtained core for magnetic head 16, a highly accurate track that is free from microcracks or adhesion of solidified molten substances is formed, which is high in reliability.

Additionally, the present invention is not intended to be limited to the manufacturing method of cores for VTR magnetic head and can be suitably applied to the cores for diversified magnetic heads, such as RDD, FDD, or the like. Further, the present invention is not limited to the track machining and also can be suitably utilized in various processings of ferrite materials, Sendust materials and further composite materials of ferrite and Sendust, such as machining of coil turn holes, machining of air bearing surface, or the like.

As described above, according to the producing method of the present invention, tracks having a narrow width can be formed on a gapped bar in a high accuracy without causing denaturing or processing strain due to heat nor forming microcracks, by irradiating a predetermined laser beam at a predetermined scanning speed in a phosphoric acid or alkali metal hydroxide aqueous solution of a predetermined concentration, so that cores for magnetic head high in reliability can be produced.

What is claimed is:

1. In a method of producing a core for magnetic head, wherein a track width of the core for magnetic head is defined by a laser machining, the improvement comprising machining by a laser-induced etching wherein a laser beam having a focused beam diameter of not larger than 50 μm and a power (P) of 50~1,900 mW is irradiated, in a 10~90 weight % phosphoric acid aqueous solution, at a scanning speed (V) in the range between 2 μm/sec and 200 μm/sec which scanning speed satisfies simultaneously both the following conditions:

$$V \leq 0.31P + 34 \text{ and}$$

$$V \leq -0.14P + 271.$$

2. In a method of producing a core for magnetic head made of ferrite, wherein a track width of the core for magnetic head is defined by a laser machining, the improvement comprising machining by a laser-induced etching wherein a laser beam having a focused beam diameter of not larger than 20 μm and a power (P) of 50~1,300 mW is irradiated, in a 5~55 weight % alkali metal hydroxide aqueous solution, at a scanning speed (V) in the range between 2 μm/sec and 150 μm/sec which scanning speed satisfies simultaneously both the following conditions:

$$V \leq 0.34P + 13 \text{ and}$$

$$V \leq -0.17P + 217.$$

3. In a method of producing a core for magnetic head made of Sendust, wherein a track width of the core for magnetic head is defined by a laser machining, the improvement comprising machining by a laser-induced etching wherein a laser beam having a focused beam diameter of not larger than 20 μm and a power (P) of 50~1,000 mW is irradiated, in a 5~55 weight % alkali metal hydroxide aqueous solution, at a scanning speed (V) in the range between 2 μm/sec and 70 μm/sec which scanning speed satisfies simultaneously both the following conditions:

$V \leq 0.1P + 10$ and $V \leq -0.18P + 180.$

4. In a method of producing a composite core for magnetic head composed of ferrite and Sendust, wherein a track width of the core for magnetic head is defined by a laser machining, the improvement comprising machining by a laser-induced etching wherein a laser beam having a focused beam diameter of not larger than 20 μm and a power (P) of 50~1,000 mW is irradiated, in a 5~55 weight % alkali metal hydroxide aqueous solution, at a scanning speed (V) in the range between 2 μm/sec and 130 μm/sec which scanning speed satisfies simultaneously both the following conditions:

$V \leq 0.34P + 13$ and $V \leq -0.19P + 190.$

* * * * *